United States Patent [19]

Kawarasaki

[11] Patent Number: 5,087,072
[45] Date of Patent: Feb. 11, 1992

[54] ATTITUDE CHANGE SUPPRESSIVE CONTROL SYSTEM FOR ACTIVE SUSPENSION SYSTEM FOR AUTOMOTIVE VEHICLE

[75] Inventor: Yoshihiro Kawarasaki, Kanagawa, Japan

[73] Assignee: Nissan Motor Company, Limited, Japan

[21] Appl. No.: 559,859

[22] Filed: Jul. 30, 1990

[30] Foreign Application Priority Data

Jul. 31, 1989 [JP] Japan .................................. 1-199115

[51] Int. Cl.$^5$ .............................................. B62D 9/02
[52] U.S. Cl. ...................................... 280/772; 280/707; 364/424.05
[58] Field of Search ............... 280/772, 689, DIG. 1, 280/707; 364/424.05

[56] References Cited

U.S. PATENT DOCUMENTS

| | | | |
|---|---|---|---|
| 4,693,493 | 9/1987 | Ikemoto et al. | 280/689 |
| 4,702,490 | 10/1987 | Yamaguchi et al. | 280/707 |
| 4,730,843 | 3/1988 | Tanaka et al. | 280/689 |
| 4,787,644 | 11/1988 | Yokote et al. | 280/DIG. 1 |
| 4,869,528 | 9/1989 | Buma et al. | 280/772 |
| 4,961,595 | 10/1990 | Fukushima et al. | 280/772 |

FOREIGN PATENT DOCUMENTS

| | | |
|---|---|---|
| 0249209 | 6/1987 | European Pat. Off. . |
| 0249227 | 6/1987 | European Pat. Off. . |
| 0283004 | 3/1988 | European Pat. Off. . |
| 0284053 | 3/1988 | European Pat. Off. . |
| 0285153 | 3/1988 | European Pat. Off. . |
| 0286072 | 4/1988 | European Pat. Off. . |
| 63-154413 | 6/1988 | Japan . |

Primary Examiner—Kenneth R. Rice
Attorney, Agent, or Firm—Lowe, Price, LeBlanc & Becker

[57] ABSTRACT

An active suspension system includes active cylinders having a working chamber and disposed between a vehicular body and road wheels at respective of suspension systems. The system also includes vehicular height monitoring means for monitoring vehicular height at respective ones of the suspension systems for providing vehicular height indicative data. The system performs a height regulating mode operation, in which a front height adjustment command for the front suspension systems is derived on the basis of an average height data related to front-left and front-right vehicular height data, and a rear height adjustment command for rear suspension systems derived on the basis of an average height data related to rear-left and rear-right vehicular height data. On the other hand, the system performs an anti-roll operation by deriving vehicular rolling magnitude and deriving anti-rolling control command to be selectively added to and subtracted from the respective height adjustment commands so that suspension characteristics at the left and right suspension systems can be adjusted in opposite directions.

8 Claims, 10 Drawing Sheets

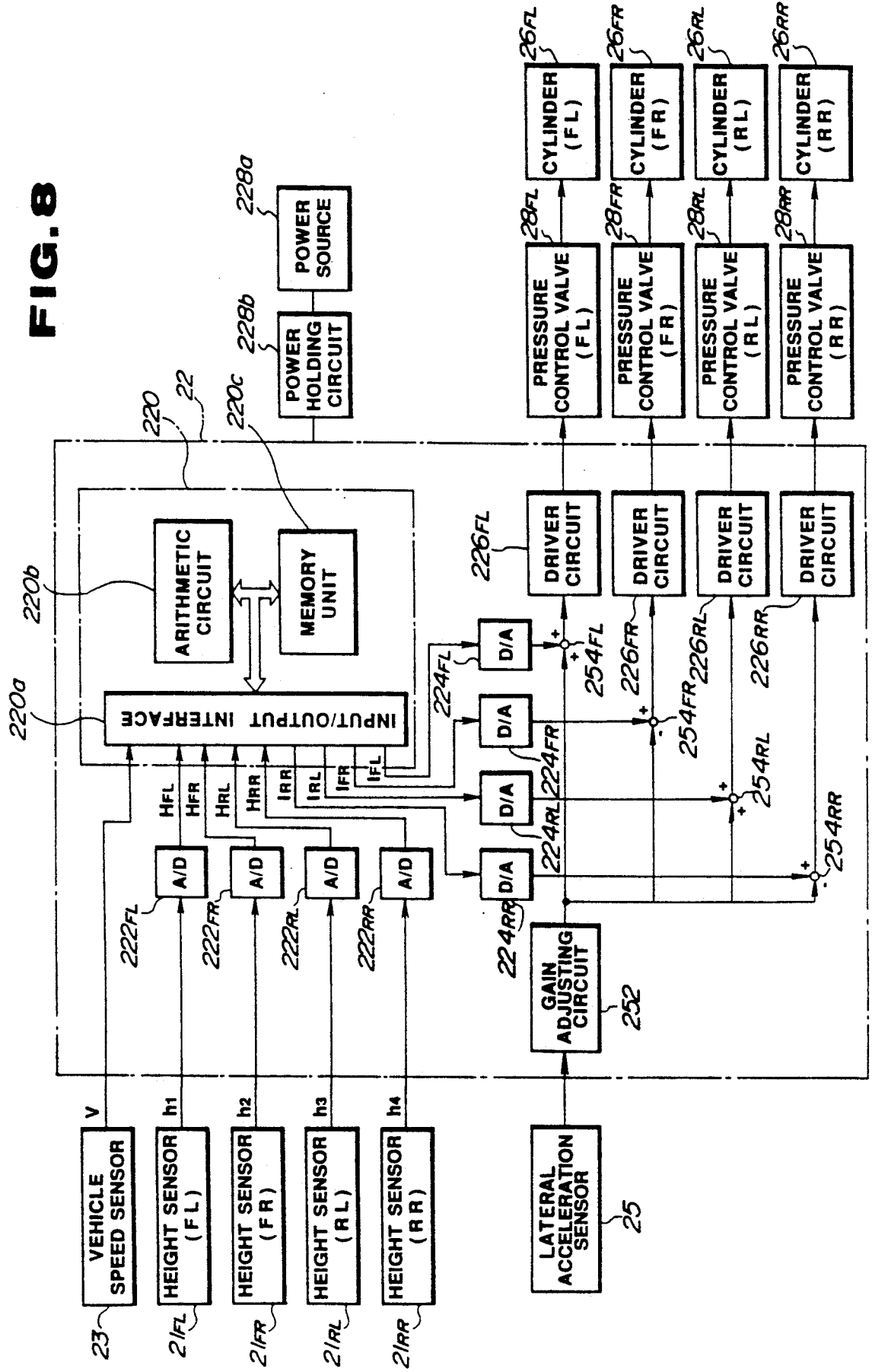

ATTITUDE CHANGE SUPPRESSIVE CONTROL SYSTEM FOR ACTIVE SUSPENSION SYSTEM FOR AUTOMOTIVE VEHICLE

BACKGROUND OF THE INVENTION

1. Field of the Invention

The present invention relates generally to an active suspension system which detects a predetermined vehicular driving condition and performs suspension control for regulating vehicular height level and suppressing vehicular attitude variation, such as pitching, rolling and so forth.

2. Description of the Background Art

U.S. Pat. No. 4,702,490, issued on Oct. 27, 1987 which has been assigned to the common owner to the present invention, discloses one of typical construction of an actively controlled suspension system, in which a hydraulic cylinder defining a working chamber is disposed between a vehicular body and a suspension member rotatably supporting a vehicular wheel. The working chamber of the hydraulic cylinder is communicated with a hydraulic circuit including a pressurized working fluid source. A pressure control valve, such as an proportioning valve assembly, is disposed in the hydraulic circuit, which is connected to an electric or electronic control circuit for controlling the valve position. The pressure control valve controls the valve position by a suspension control signal produced in the control circuit for adjusting pressure in the working chamber and thereby controls suspension characteristics.

On the other hand, European Patents 0 283 004, 0 285 153 and 0 284 053 discloses technologies for controlling the suspension systems constructed as set forth above, depending upon the vehicle driving condition for suppressing rolling and/or pitching of the vehicular body.

On the other hand, Japanese Patent First (unexamined) Publication (Tokkai) Showa 63-154413 discloses a vehicular height regulation technology in an active suspension system. The disclosed system allows independent height adjustment at left and right rear suspension systems by means of pressure control valves operable independent of each other. In contrast to this, the shown system employs a common pressure control valve for adjusting height level at left and right front suspension systems. In the practical operation of the shown active suspension system, the height adjustment for the rear suspension systems is performed in advance of adjustment of height level at the front suspension systems. By providing difference in timing of height adjustment between the front and rear suspension systems, hunting in fine adjustment of the vehicular height can be successfully prevented.

On the other hand, with the prior proposed construction, anti-pitching can be performed successfully for effectively suppressing vehicular pitching motion. However, an anti-rolling operation cannot be performed as readily because of impossibility of independent control of the height level at the front suspension systems. Particularly, when the vehicular passenger or luggage load is uneven in transverse direction to cause lateral shifting of the gravity center of the vehicle, the fluid pressure in the working chamber of active cylinders in rear suspension systems, which are controlled independently of the other, even while no lateral acceleration is exerted on the vehicle. By difference of the initial fluid pressure, range of pressure adjustment at the left and rear suspension systems are differentiated to each other. This causes difference of roll stabilizing capacity for left-hand and right-hand turns for degrading drivability.

SUMMARY OF THE INVENTION

Therefore, it is an object of the present invention to provide an active suspension system which can solve the problems in the prior proposed arts.

Another object of the invention is to provide an active suspension system which enables to satisfactorily perform anti-rolling operation and can facilitate uniform pressure adjustment ranges.

In order to accomplish aforementioned and other objects, an active suspension system, according to the present invention, includes active cylinders having a working chamber and disposed between a vehicular body and road wheels at respective of suspension systems. The system also includes vehicular height monitoring means for monitoring the vehicular height at respective ones of suspension systems for providing vehicular height indicative data. The system performs height regulating mode operation, in which a front height adjustment command for front suspension systems is derived on the basis of an average height data at front-left and front-right vehicular height data, and rear height adjustment command for rear suspension systems is derived on the basis of an average height data at rear-left and rear-right vehicular height data. On the other hand, the system performs an anti-roll operation by deriving vehicular rolling magnitude and deriving an anti-rolling control command to selectively be added to and substracted from the respective of height adjustment command so that suspension characteristics at left and right suspension systems can be adjusted in opposite directions.

According to one aspect of the invention, an active suspension system comprises:

a plurality of active cylinders having a working chamber and disposed between a vehicular body and road wheels at respective of suspension systems vehicular height monitoring means for monitoring vehicular height at respective of suspension systems for providing vehicular height indicative data means for performing height regulation, in which front height adjustment command for front suspension systems is derived on the basis of an average height data at front suspension systems, and rear height adjustment command for rear suspension systems is derived on the basis of an average height data at rear suspension systems and means for performing anti-roll control by deriving vehicular rolling magnitude and deriving anti-rolling control command to be added to and substracted from the respective of height adjustment command so that suspension characteristics at left and right suspension systems can be adjusted in opposite directions.

The height regulation means may be set a predetermined target height and a predetermined height control deadband set with respect to the target height so that height adjustment is initiated while the vehicular height level is maintained out of the deadband. On the other hand, the anti-rolling control means may include means for arithmetically deriving magnitude of rolling on the basis of the vehicular height indicative data from vehicular height monitoring means, and deriving the anti-rolling control command on the basis of the rolling magnitude. In the later case, the rolling magnitude deriving means may calculate the rolling magnitude on the basis of vehicular height data of left and right suspension systems.

Preferably, the anti-rolling control means includes a lateral acceleration sensor for monitoring a lateral acceleration exerted on the vehicular body to produce a lateral acceleration indicative signal and means for converting the lateral acceleration indicative signal into an anti-rolling control command.

Further preferably, the height regulation means is further set an acceptable height range which is set with respect to the target height in narrower range than the height control deadband so that height adjustment is terminated when the vehicular height level at each of the suspension systems enters within the acceptable height range.

The anti-rolling control means may also be set at a rolling control deadband so that anti-rolling control is initiated when the rolling magnitude increased to be out of the rolling control deadband. In such case, it is preferred to also set an acceptable rolling magnitude range which is smaller than the rolling control deadband so that anti-rolling operation is terminated when the rolling magnitude becomes smaller than the acceptable rolling magnitude.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 8 is a block diagram of another embodiment of a control system according to the invention.

DESCRIPTION OF THE PREFERRED EMBODIMENT

Figure 1:
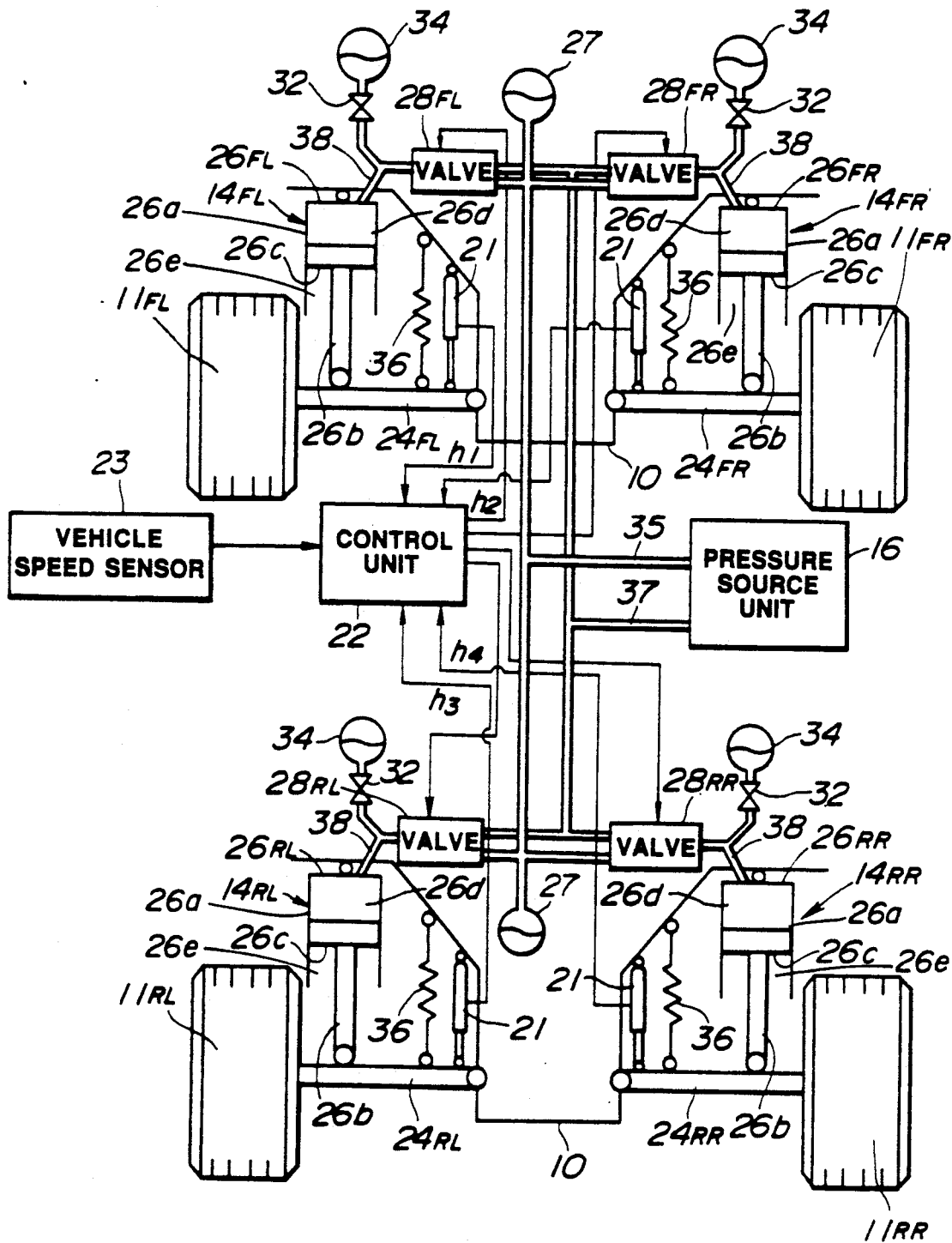
FIG. 1 is a diagrammatical illustration of the overall construction of the preferred embodiment of an active suspension system, according to the present invention, in which the preferred embodiment of a proportioning valve assembly is employed as a pressure control valve.

Referring now to the drawings, particularly to FIG. 1, the preferred embodiment of an active suspension system, according to the present invention, is designed to generally perform suspension control for regulating vehicular height level and vehicular attitude by suppressing relative displacement between a vehicular body 10 and suspension members 24FL, 24FR, 24RL and 24RR provided in front-left, front-right, rear-left and rear-right suspension mechanism 14FL, 14FR, 14RL and 14RR and rotatably supporting front-left, front-right, rear-left and rear-right wheels 11FL, 11FR, 11RL and 11RR. The suspension member will be hereafter represented by the reference numeral 24 as generally referred to. Similarly, the suspension mechanism as generally referred to will be hereafter represented by the reference numeral 14 Respective front-left, front-right, rear-left and rear-right suspension mechanisms 14FL, 14FR, 14RL and 14RR have fluid pressure actuators, namely hydraulic cylinders 26FL, 26FR, 26RL and 26RR which will be represented by the reference numeral 26 as generally referred to.

Each of the hydraulic cylinder 26 is disposed between the vehicular body 10 and the suspension member 24 to produce a damping force for suppressing relative displacement between the vehicular body and the suspension member. The hydraulic cylinder 26 generally comprises an essentially enclosed cylindrical cylinder body 26a defining therein an enclosed chamber. A thrusting piston 26c is thrustingly and slidably disposed within the enclosed chamber of the hydraulic cylinder 26 for defining in the latter a working chamber 26d and a reference pressure chamber 26e. The working chamber 26d may be communicated with the reference pressure chamber 26e via an orifice formed through the piston for fluid communication therebetween in a substantially restricted amount. The piston 26c is connected to the associated one of suspension member 24 via a piston rod 26b. A suspension coil spring 36 employed in the shown type of the suspension system is not required a resilient force in a magnitude required in the ordinary suspension system and only required the resilient force necessary for maintaining the vehicular body about the suspension member.

The working chamber 26d of the hydraulic cylinder 26 is connected to one of pressure control valves 28FL, 28FR, 28RL and 28RR via a pressure control line 38. The pressure control valve 28FL, 28FR, 28RL and 28RR will be hereafter represented by the reference numeral 28 as generally referred to. The pressure control valve 28 is, in turn, connected to a pressure source unit 16 via a supply line 35 and a drain line 37. A branch circuit is provided for connecting the pressure control line 38 to a pressure accumulator 34 via a flow restricting means, such as an orifice 32. Another pressure accumulator 27 is provided in the supply line 35 for accumulating the excessive pressure generated in the pressure source unit 16.

The pressure control valves 28 comprise, though it is not clearly shown in FIG. 1, electrically or electromagnetically operable actuators (reference is made to FIG. 2), such as proportioning solenoids. The actuators are connected to a microprocessor based control unit 22. The control unit 22 is connected to a plurality of vehicular height sensors 21FL, 21FR, 21RL and 21RR are disposed in respectively associated suspension mechanism and designed for monitoring relative position of the vehicular body 10 and the relevant suspension member 24 to produce vehicular height level indicative signals $h_1$, $h_2$, $h_3$ and $h_4$. The height sensors as generally referred to will be identified by the reference numeral 21. The vehicular height sensor 21 may comprise a stroke sensor for monitoring stroke of relative motion between the vehicular body and the associated suspension member so as to produce the vehicular height level indicative signal which represents magnitude of relative displacement from a predetermined neutral height position which is determined in terms of the vehicular body maintained at a predetermined target height level. In the shown embodiment, the control unit 22 is also connected to a vehicle speed sensor 23 for monitoring vehicular traveling speed to produce a vehicle speed indicative signal V.

It should be appreciated that though the shown embodiment employs the vehicular height sensor, such as stroke sensor for monitoring the vehicular height and variation of the vehicular height level, it may be possible to employ an acceleration sensor for monitoring vertical acceleration at associated suspension mechanism. In such case, the magnitude of vehicular height level may be arithmetically derived by integrating the vertical acceleration measured by the acceleration sensor. Therefore, it should be appreciated that the vehicular height sensor 21 may also comprise a vertical acceleration sensor.

Figure 2:
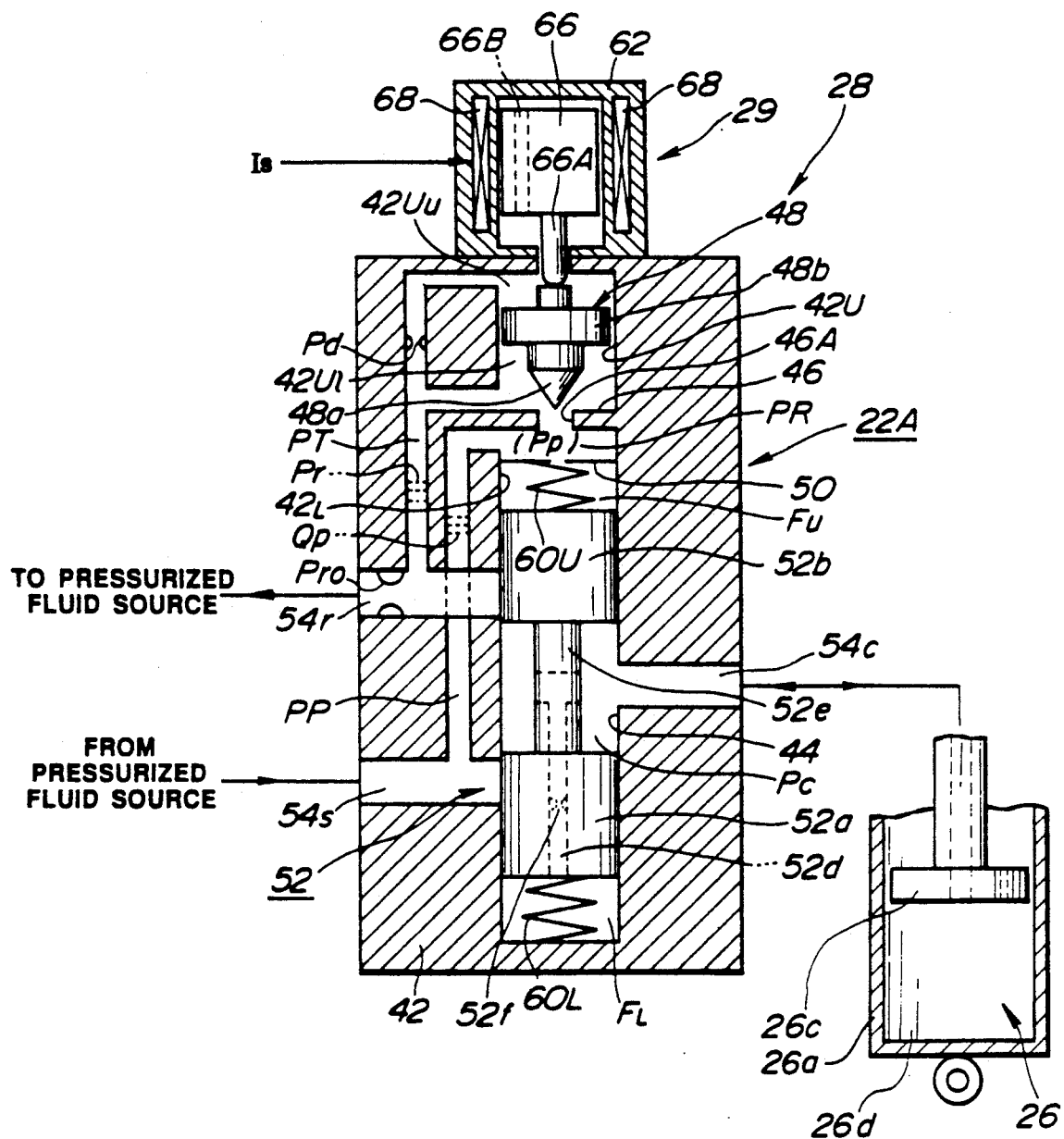
FIG. 2 is a sectional view of the preferred embodiment of the pressure control valve according to the present invention.

As shown in FIG. 2 in detail, the pressure control valve 28 comprises a proportioning valve assembly and is designed to be controlled by an electric current as a control signal supplied from the control unit 22 for varying valve position according to variation of the current value of the control signal. Generally, the pressure control valve 28 controls magnitude of introduction and draining of pressurized fluid into and from the working chamber 26d for adjusting the pressure in the working chamber. As will be appreciated, since the adjusted fluid pressure in the working fluid determines damping force to be created in response to relative displacement between the vehicle body 10 and the suspension member 24. Mode of the suspension mechanism is varied according to variation of the fluid pressure in the working chamber between a predetermined hardest mode to most soft mode.

In the construction of the pressure control valve shown in FIG. 2, the pressure control valve 28 includes a valve housing 42. The valve housing 42 defines a valve bore 44 which is separated into a valve chamber 42L and a control chamber 42U by means of a partitioning wall 46. The partitioning wall 46 is formed with a communication path opening 46A for communication between the control chamber 42U and the valve chamber 42L. As seen from FIG. 2, the control chamber 42U and the valve chamber 42L are arranged in alignment to each other across the communication path opening 46A. In parallel to a section of the partitioning wall 46 extending perpendicular to the axis of the valve chamber 42L and the control chamber 42U, a fixed orifice defining partitioning member 50 is provided. The partitioning member 50 defines a throttling orifice which is oriented substantially in alignment with the communication path opening 46A. The partitioning wall 46 and the partitioning member 50 are cooperative for defining a pilot chamber PR therebetween.

A valve spool 52 is thrustingly and slidingly disposed within the valve chamber 42L. The valve spool 52 defines an upper feedback chamber FU between the tip end thereof and the partitioning member 50. The valve spool 52 also defines a lower feedback chamber FL between the other tip end thereof and the bottom of the valve chamber 42L. Offset springs 60U and 60L are disposed within the upper and lower feedback chambers FU and FL, which offset springs exert spring force to the valve spool 52 for resiliently restricting movement of the latter. Resilient force of the offset springs 60U and 60L are so set as to balance to place the valve spool 52 at a neutral position, when the fluid pressure in the upper and lower feedback chambers FU and FL balances to each other. The valve chamber 42L is communicated with the supply line 35 via an supply port 54s, the drain line 37 via a drain port 54r and a pressure control line 38 via a control port 54c, which supply port, drain port and control port are defined in the valve housing 42. The valve spool 52 at the aforementioned neutral position, blocks fluid communication of the pressure control chamber PC with any of the supply port 54s and the drain port 54r. As a result, as long as the valve spool 52 is maintained at the neutral position, overall fluid force in the hydraulic circuit downstream of the pressure control valve, which circuit includes the working chamber 26d of the hydraulic cylinder 26 is held constant.

The valve spool 52 is formed with lands 52a and 52b connected to each other via smaller diameter bar-like section 52e. The land 52a is oriented adjacent the lower feedback chamber FL so as to subject the tip end to the fluid pressure in the lower feedback chamber. Similarly, the land 52b is oriented adjacent the upper feedback chamber FU so as to subject the tip end to the fluid pressure in the upper feedback chamber. The bar-like section 52e between the lands 52a and 52b is cooperative with the peripheral wall of the valve chamber 42L in order to define therebetween a pressure control chamber PC. A fluid flow path 52d is formed through the valve spool 52. The fluid flow path 52d has one end communicated with the pressure control chamber PC and the other end communicated with the lower feedback chamber FL. A fixed flow restricting orifice 52f is formed in the fluid flow path 52d for restricting fluid flow therethrough.

A poppet valve member 48 is disposed within the control chamber 42U for thrusting movement therein. The poppet valve member 48 has a valve head 48a of an essentially conical configuration. The valve head 48a opposes to the communication path opening 46A of the partitioning wall 46. The poppet valve member 48 is operably associated with a proportioning solenoid assembly 29 serving as an actuator. The proportioning solenoid assembly 29 comprises a housing 62 rigidly secured on the valve housing 42 and defining an internal space to receive therein a plunger 66. The plunger 66 has a plunger rod 66A. The tip end of the plunger rod 66A is kept in contact with the tip end of the poppet valve member 48 remote from the valve head 48a. Therefore, the poppet valve member 48 is axially driven by means of the plunger 66 to control the path area in the communication path opening 46A according to the position of the tip end of the plunger rod 66A. Adjusting of the path area in the communication path opening 46A results in variation of fluid pressure to be introduced into the pilot chamber PR.

In order to control the position of the plunger 66 with the plunger rod 66A, a proportioning solenoid coil 68 is housed within the housing 62 and surrounds the plunger 66. The interior space of the housing 62 is connected to the control chamber 42U for fluid communication therebetween. The plunger 66 is formed with a fluid path 66B for fluid communication between upper and lower sections of the interior space. Therefore, the fluid pressure in the upper and lower sections of the interior space of the housing 62 is held equal to the pressure in the control chamber 42U. This cancels fluid pressure to be exerted on the poppet valve and the plunger so that the position of the tip end of the plunger rod 66A can be determined solely depending upon the magnitude of energization of the proportioning solenoid coil 68.

As seen from FIG. 2, the poppet valve member 48 has a cylindrical larger diameter section 48b for separating the control chamber 42U into upper section and lower section 42Uu and 42Ul. The upper and lower sections 42Uu and 42Ul are communicated with the drain port 54r via a pilot return path PT. A multi-stage orifice Pr is provided in the pilot return path PT for restricting fluid flow therethrough. The multi-stage orifice Pr comprises a plurality of strips formed with through openings and is so designed that one of the orifice oriented at most upstream side is mainly effective for restricting fluid flow when fluid flowing therethrough is steady flow and that all of the orifices of respective strips are equally effective for restricting fluid flow when fluid flow therethrough is disturbed and not steady. Therefore, as will be appreciated herefrom, the multi-stage orifice Pr employed in the shown embodiment serves to provide greater fluid flow restriction against non-steady or disturbed fluid flow than that for the steady flow. As seen from FIG. 2, the multi-stage orifice Pr is provided upstream of the upper and lower sections 42Uu and 42Ul. On the other hand, a fixed throttling orifice Pd is provided at an orientation downstream of the lower section 42Ul and upstream of the upper section 42Uu. Similarly, the pilot chamber PR is communicated with the supply port 54s via a pilot path PP. A multi-stage orifice Qp which has similar construction and flow restricting function to that of the multi-stage orifice Pr is provided in the pilot path PP.

A fixed throttle orifice Pro is also provided in the drain port 54r for restricting fluid flow therethrough. The diameter of the fluid path at the orifice Pro is so selected as to create great flow restriction against pulsatile fluid flow cyclically varying the fluid pressure at a frequency approximately 1 Hz.

As can be seen from FIG. 2, the pressure control valve 28 is so arranged as to direct the axis of the valve bore 44 parallel to the longitudinal axis of the vehicle body. The longitudinal acceleration to be exerted on the vehicular body is much smaller than the lateral acceleration and vertical acceleration exerted on the vehicle body. Therefore, by arranging the pressure control valve 28 so that the poppet valve 48 and the valve spool 52 thrustingly move in longitudinal direction, influence of the externally applied acceleration can be minimized.

Figure 3:
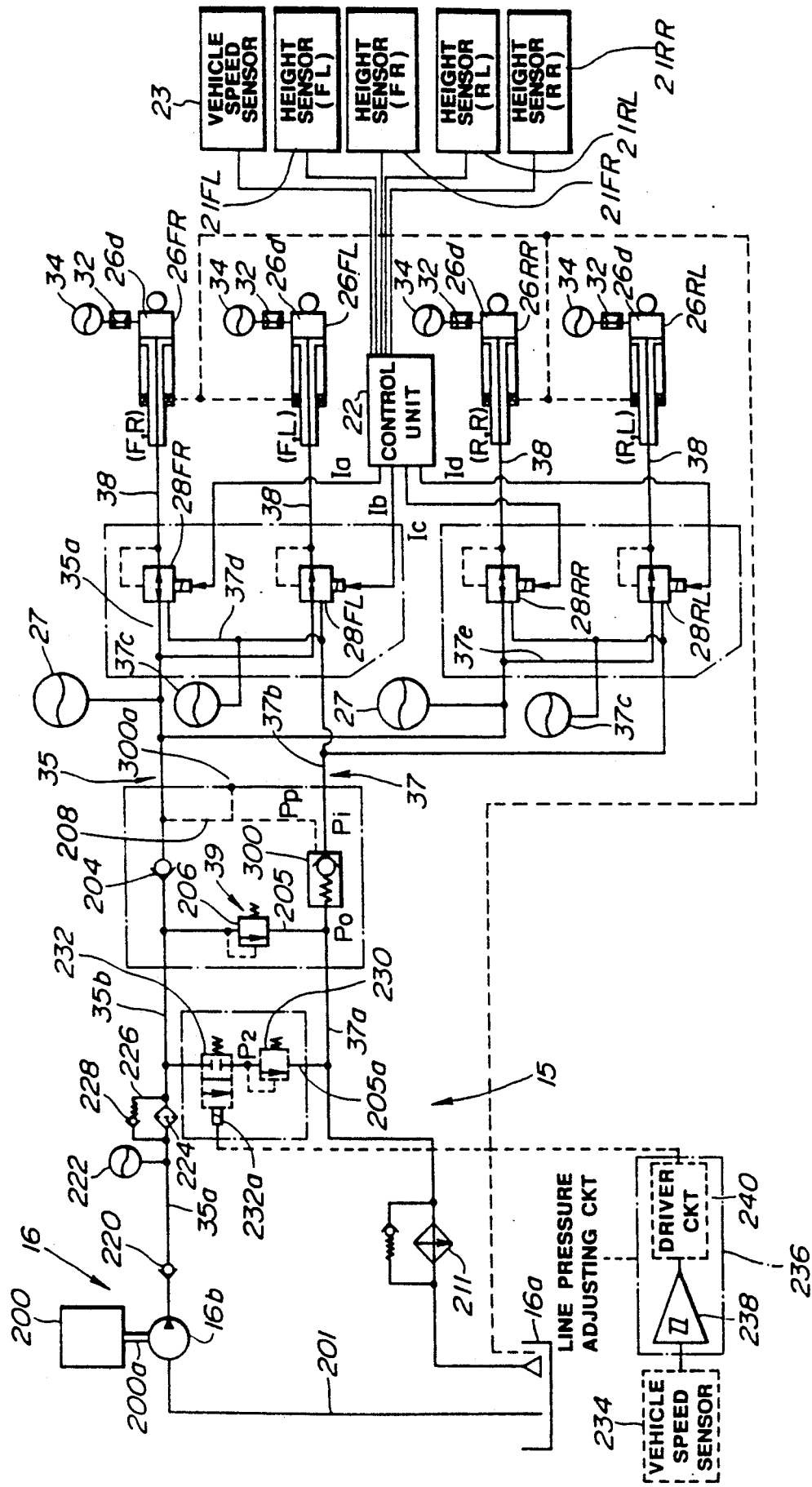
FIG. 3 is a circuit diagram of one example of hydraulic circuit which is applicable for the active suspension system according to the present invention.

FIG. 3 shows detailed circuit construction of one example of hydraulic circuit which is applicable for the shown embodiment of the active suspension system, according to the present invention. The hydraulic circuit includes a fluid pressure source circuit 15 which includes the pressure source unit 16. The pressure source unit 16 includes the pressure unit 16b which comprises a fluid pump, and is connected to a fluid reservoir 16a via a suction pipe 201. The fluid pump 16b is associated with an automotive engine 200 so as to be driven by the output torque of the latter output from an engine output shaft 200a. The outlet of the pressure unit 16, through which the pressurized working fluid is discharged, is connected to the supply ports 54s of the pressure control valves 28FL, 28FR, 28RL and 28RR respectively associated with the hydraulic cylinders 26FL, 26FR, 26RL and 26RR, via the supply line 35. A one-way check valve 220, a pressure accumulator 222 for absorbing pulsatile, a filter 224 are disposed in a portion 35b of the supply line 35. A by-pass passage 226 with a one-way check valve 228 is provided for by-passing the filter 224. The supply line 35 has branch lines 35a respectively connected to the supply ports 54s of respectively corresponding pressure control valves 28FL, 28RL and 28RR.

A high pressure accumulators 27 are also connected to the supply line 35 to receive therefrom the pressurized fluid for accumulating the pressure, which accumulator has large capacity and high set pressure, e.g. several tens kg/cm². A one-way check valve 204 is disposed in the supply line 35 at the position upstream of the junction between the high pressure accumulators 27 and the supply line 35.

A pressure relief line 205 is also connected to the supply line 35 at the position intermediate between the filter 224 and the one-way check valve 204, at one end. The other end of the pressure relief line 205 is connected to the drain line 37. A pressure relief valve 206 is disposed in the pressure relief line 205. The pressure relief valve 206 is responsive to the fluid pressure in the supply line 35 higher than a set pressure to drain the excessive pressure to the drain line for maintaining the pressure in the supply line 35 below the given first line pressure level.

It should be noted if desired, line pressure can be adjusted depending upon a preselected vehicle driving parameter such as a vehicle speed. In case, the vehicle speed dependent variable line pressure is desired, another pressure relief valve 230 may be provided in parallel to the pressure relief valve 206. The pressure relief valve 230 is disposed in an additional pressure relief line 205a which extends parallel to the pressure relief line 205 and thus connected to the section 35a of the supply line 35 in the fluid pressure source circuit 15 at the upstream end and to the section 37a of the drain line 37 in the fluid pressure source circuit at the downstream end.

Though it is not essential for the present invention, it may be possible to provide an electromagnetic shut-off valve 232 in the pressure relief line 205a at an orientation upstream of the pressure relief valve 230 for the purpose of a vehicular speed dependent suspension control characteristics by adjusting line pressure in the supply line. In such case, the pressure relief valve 205a is provided lower set pressure than that of the pressure relief valve 206 so as to adjust the line pressure in the supply line 35 at a second line pressure level which is lower than the first line pressure level. The electromagnetic shut-off valve 232 may have an electromagnetic solenoid 232a connected to a line pressure adjusting circuit 236 so that it may be operated in response to a line pressure control signal from the latter to switch valve position between an open position to establish fluid communication between the supply line 35 and the pressure relief valve 230 and a closed position to block fluid communication therebetween. The line pressure adjusting circuit 236 comprises a Schumitt trigger circuit 238 and a driver circuit 240. The Schumitt trigger circuit 238 is connected to a vehicle speed sensor 234 which monitors vehicle speed to produce a vehicle traveling speed to produce a vehicle speed indicative signal V. The Schmitt trigger circuit 238 is designed to respond to a vehicle speed indicative signal value greater than a preset speed to output HIGH level signal and output LOW level signal otherwise. The driver circuit 240 is so designed as to output driver current to the solenoid 232a of the electromagnetic shut-off valve 232 for energizing the solenoid to place the shut-off valve at open position when the output of the Schmitt trigger circuit 238 is held LOW level. The preset speed of the Schmitt trigger circuit 238 represents substantially low vehicle speed where adjustment of the fluid pressure in the working chamber 26d of the hydraulic cylinder 26 is not required. Therefore, while the vehicle is not running or is traveling at substantially low speed lower than the set speed, the pressure relief valve 230 becomes active to relieve the pressure in excess of the second relief pressure. Therefore, the line pressure in the supply line 35 is lowered to reduce the load on the engine for driving the fluid pump 16b can be reduced.

On the other hand, an operational one-way check valve 300 is disposed between sections 37a and 37b of the drain line 37. The section 37b of the drain line 37 forms two branches. As can be seen from FIG. 7, the drain ports 54r of the pressure control valves 28FL and 28FR are connected to one of the branch of the section 37b via a communication line 37d. For the communication line 37d, a low pressure accumulator 37c which has smaller capacity than the accumulator 27 and lower set pressure, e.g. several kg/cm$^2$, is connected. On the other hand, the drain ports 54r of the pressure control valves 28RL and 28RR are connected to one of the branch of the section 37b via a communication line 37e. For the communication line 37e, a low pressure accumulator 37c is connected. The operational one-way check valve 300 is also connected to the supply line 35 at downstream of the one-way check valve 204 to receive therefrom the pressure in the supply line as a pilot pressure, via a pilot line 208. The operational one-way check valve 300 is designed to be maintained at open position as long as pilot pressure introduced from the supply line 35 at the orientation downstream of the one-way check valve 204 is held higher than a predetermined pressure. At the open position, the operational one-way check valve maintains fluid communication between the inlet side and outlet side thereof so that the working fluid in the drain line 37 may flow therethrough to the reservoir tank 16a. On the other hand, the operational one-way check valve 300 is responsive to the working fluid pressure in the supply line downstream of the one-way check valve 204 serving as the pilot pressure dropping below the predetermined pressure level to be switched into shut-off position. At the shut-off position, the operational one-way check valve 300 blocks fluid communication between the drain port 54r of the pressure control valve 28 and the reservoir tank 16a. In the shown embodiment, the predetermined pressure is set at a pressure corresponding to the neutral pressure of the pressure control valve unit 28.

An oil cooler 211 is disposed in the drain line 37 for cooling the working fluid returning to the reservoir tank 16a.

In the shown construction, piping for drain line can be simplified by commonly using the sections 37b. Also, by providing the low pressure accumulator in the communication lines 37d and 37e, back pressure in the drain line can be successfully absorbed. Also, the pressure accumulators 37c are active for absorbing interfering pressure between two pressure control valves commonly connected to single drain line 37b.

For the section 37b of the drain line 37, a pressure accumulator 37c is provided. The pressure accumulator 37c is arranged for absorbing back pressure to be generated by flow resistance in the drain line 37.

Figure 5:
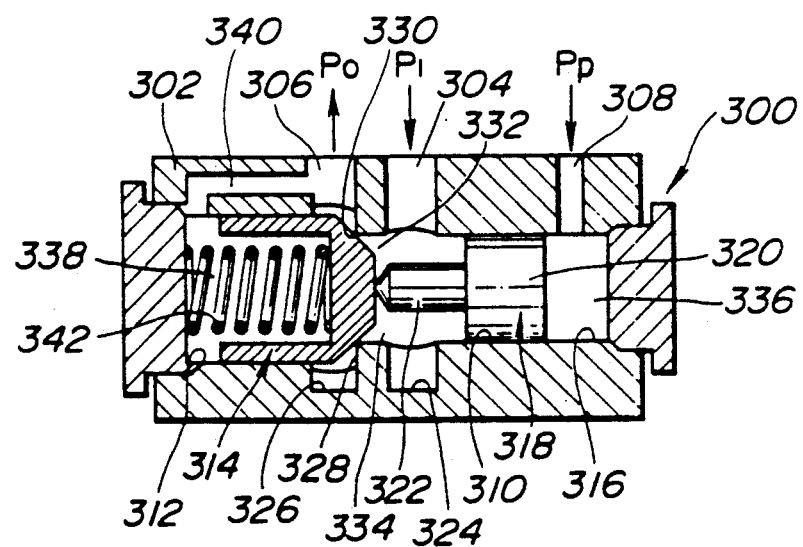
FIG. 5 is a sectional view of an operational one-way check valve employed in the preferred embodiment of the hydraulic circuit of the active suspension system of the invention.

FIG. 5 shows the detailed construction of the preferred embodiment of the operational one-way check valve 300 to be employed in the preferred embodiment of the active suspension system according to the present invention. As shown in FIG. 5, the operational one-way check valve 300 comprises a valve housing 302 formed with an inlet port 304, an outlet port 306 and a pilot port 308. The valve housing 302 defines a valve bore 310. The valve bore 310 comprises a larger diameter section 312, in which a poppet valve 314 is thrustingly disposed, and a smaller diameter section 316, in which a valve spool 318 is disposed. The pilot port 308 is communicated with the supply line 35 at the section 35a disposed between the one-way check valve 204 and the pressure control valve unit 28FL 28FR, 28RL and 28RR, via the pilot line 300a. The pilot port 308 is, on the other hand, communicated with the smaller diameter section 316 to supply the line pressure of the supply line 35 at the orientation downstream of the one-way check valve 204 as the pilot pressure Pp. On the other hand, the inlet port 304 is communicated with the drain port 54r of the pressure control valve unit 28 via a section 37b of the drain line 37. The inlet port 304 communicates with the smaller diameter section 316 via an annular groove 324 formed on the inner periphery of the valve housing 302. The outlet port 306 is communicated with the fluid reservoir 16a via a section 37a of the drain line 37 and, in turn, communicated with the larger diameter section 312 via an annular groove 326 formed on the inner periphery of the valve housing 302. As seen from FIG. 5, the annular grooves 324 and 326 are oriented in side-by-side relationship with leaving a radially and inwardly projecting land 328. The land 328 has a shoulder 330.

The valve spool 318 and the poppet valve 314 are cooperated with each other to define therebetween a control chamber 334 which communicates with the inlet port 304 and the outlet port 306. On the other hand, the valve spool 318 also defines a pilot chamber 336 at a side remote from the control chamber 334. The poppet valve 314 defines a pressure setting chamber 338 at a side remote from the control chamber 334. The pressure setting chamber 338 is communicated with the outlet port 306 via a path 340. A set spring 342 is disposed within the pressure setting chamber 338 for normally exerting a spring force to the poppet valve 314. In the preferred embodiment, the set spring 342 is provided a set force which corresponds to the neutral pressure $P_N$ of the pressure control valve unit 28.

The valve spool 318 has a valve body 320 and a valve stem 322 projecting from the valve body toward the poppet valve 314. The tip end of the valve stem 322 contacts with the mating surface of the poppet valve 314. The poppet valve 314 has an annular shoulder 332 mating with the shoulder of the land 330.

With the construction set forth above, the operational one-way check valve 300 operates as both of the pressure relief valve for relieving the excessive pressure in the drain line and one-way check valve. The relief pressure of the poppet valve 314 can be illustrated by the following balancing equation:

$$F_0 = P_{p0} \times A$$

where $F_0$ is the set pressure of the set spring 342
A is an effective area of the spool and
$P_{p0}$ is a relief pressure.

Here, assuming that the pressure Pi at the inlet port 304 is greater than or equal to the pilot pressure Pp at the pilot chamber 336, the valve spool 318 is shifted away from the poppet valve 314 so that the pilot pressure Pp in the pilot chamber 336 is not active on the valve position of the poppet valve. In such case, the poppet valve 314 operates purely as the pressure relief valve for relieving excessive pressure. At this time, the force balance as illustrated by:

$$Pi \times A = P_{p0} \times A$$

can be established. Therefore, as long as the fluid pressure at the inlet port 304 is higher than the relief pressure $P_{p0}$, the shoulder 332 of the poppet valve 314 is held away from the shoulder 330 of the land 328 so as to permit fluid flow through the outlet port 306 and the section 37a of the drain line 37 to the fluid reservoir 16a. On the other hand, when the pressure at the inlet port 304 is lower than or equal to the relief pressure $P_{p0}$, then, the spring force of the set spring 342 overcomes the fluid pressure to establish contact between the mating shoulders 332 and 330 to block fluid communication between the control chamber 334 and the outlet port 306.

On the other hand, when the pressure Pi at the inlet port 304 is lower than the pilot pressure $P_p$ in the pilot chamber 336, the valve spool 318 is shifted toward the poppet valve 314 to contact with the latter at the tip end of the valve stem 334. At this time, the force to depress the valve stem 334 onto the poppet valve 314 can be illustrated by $(P-p_i) \times A$. At this time, the pressure Pi introduced into the control chamber 334 via the inlet port 304 is canceled as an internal pressure. Therefore, the pressure balance at the poppet valve 314 can be illustrated by:

$$F_0 + kx = P_p \times A$$

where k is a spring coefficient of the set spring 342 and
x is a stroke of the poppet valve 314.

From the balancing equations given hereabove, the operational check valve 300 becomes open when the pilot pressure $P_p$ is higher than the relief pressure $P_{p0}$ and is held at shut-off position while the pilot pressure is held lower than the relief pressure.

In the hydraulic circuit set forth above, the fluid is pump 16 is driven by the engine 200 to discharge pressurized working fluid while the engine is running. The pressurized fluid discharged from the outlet of the fluid pump 16 is fed to the pressure control valve 28 via the supply line 35 including the pressure regulating orifice 202 and the one-way check valve 204. When the pressure control valve 28 is shifted to establish fluid communication between the supply port 54s and the pressure control port 54c from the valve position shown in FIG. 2, the pressurized working fluid passes the pressure control valve 28 and introduced into the working chamber 26d of the hydraulic cylinder 26. On the other hand, when the pressure control valve 28 is shifted to block fluid communication between the supply port 54s and the pressure control chamber PC, the fluid pressure in the supply line 35 increases. When the line pressure in the supply line 35 becomes higher than or equal to the set pressure of the pressure relief valve 206 in the pressure relief line 205, the excessive pressure is fed to the drain line 37 via the pressure relief valve 206 and thus returned to the reservoir tank 16a.

The fluid pressure in the supply line 35 is also fed to the operational one-way check valve 300 via the pilot line 208. As set forth, the operational one-way check valve 300 is placed at open position as long as the pilot pressure introduced through the pilot line 300a is held higher than or equal to the set pressure thereof. Therefore, fluid communication between the pressure control valve 28 and the reservoir tank 16a is maintained. At this position, the working fluid is thus returned to the reservoir tank 16a via the drain line 37 via the operational one-way check valve 300 and the oil cooler 211.

The operational one-way check valve 300, even at the open position, serves as a resistance to the fluid flow. Therefore, the fluid pressure in the drain line 37 upstream of the operational one-way check valve 300 becomes higher, i.e. higher than the offset pressure $P_0$. Then, the pressure relief valve 209 becomes active to open for allowing the excessive pressure of the working fluid to flow through the by-pass line 210.

When the engine stops, the pressure unit 16 ceases operation. By stopping the pressure unit 16, the working fluid pressure in the supply line 35 drops. According to drop of the pressure in the supply line 35, the pilot pressure to be exerted to the operational one-way check valve 300 via the pilot line 300a drops. When the pressure in the pilot line 300a drops below or equal to the set pressure, the operational one-way check valve 300 is switched into operational one-way check position to block fluid communication therethrough. As a result, the fluid pressure in the drain line 37 upstream of the operational one-way check valve 300 becomes equal to the pressure in the working chamber 26d. Therefore, even when the working fluid leaks through a gap between the spool valve 52 and the inner periphery of the valve bore, it is not affect the fluid pressure in the working chamber.

Figure 4:
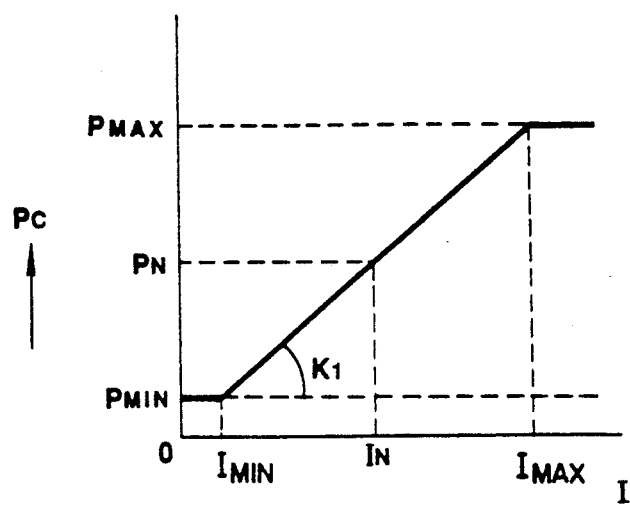
FIG. 4 is a chart showing relationship between an electric current value of a control signal to be supplied for an actuator of the pressure control valve and a working fluid pressure supplied to a working chamber of a hydraulic cylinder.

FIG. 4 shows variation of the working fluid pressure in the working chamber 26d of the hydraulic cylinder 26 according to variation of the current value of the control signal applied to the actuator 29 of the pressure control valve 28. As seen from FIG. 4, the hydraulic pressure in the working chamber 26d varies between a maximum pressure $P_{MAX}$ which is saturation pressure of the pressure source unit 16 and a minimum pressure $P_{MIN}$ which is set at a magnitude in view of a noise component to be contained in the control signal. As seen from FIG. 4, the maximum pressure $P_{MAX}$ corresponds to the maximum current value $I_{MAX}$ of the control signal and the minimum pressure $P_{MIN}$ corresponds to the minimum current value $I_{MIN}$ of the control signal. Furthermore, the hydraulic pressure level as labeled $P_N$ represents neutral pressure at the neutral current $I_N$. As seen, the neutral current $I_N$ is set at an intermediate value between the maximum and minimum current values $I_{MAX}$ and $I_{MIN}$. As can be seen from FIG. 4, the fluid pressure varies linearly between the maximum and minimum pressure $P_{MAX}$ and $P_{MIN}$ with a gradient $K_1$ which represents setting of response characteristics.

Figure 6:
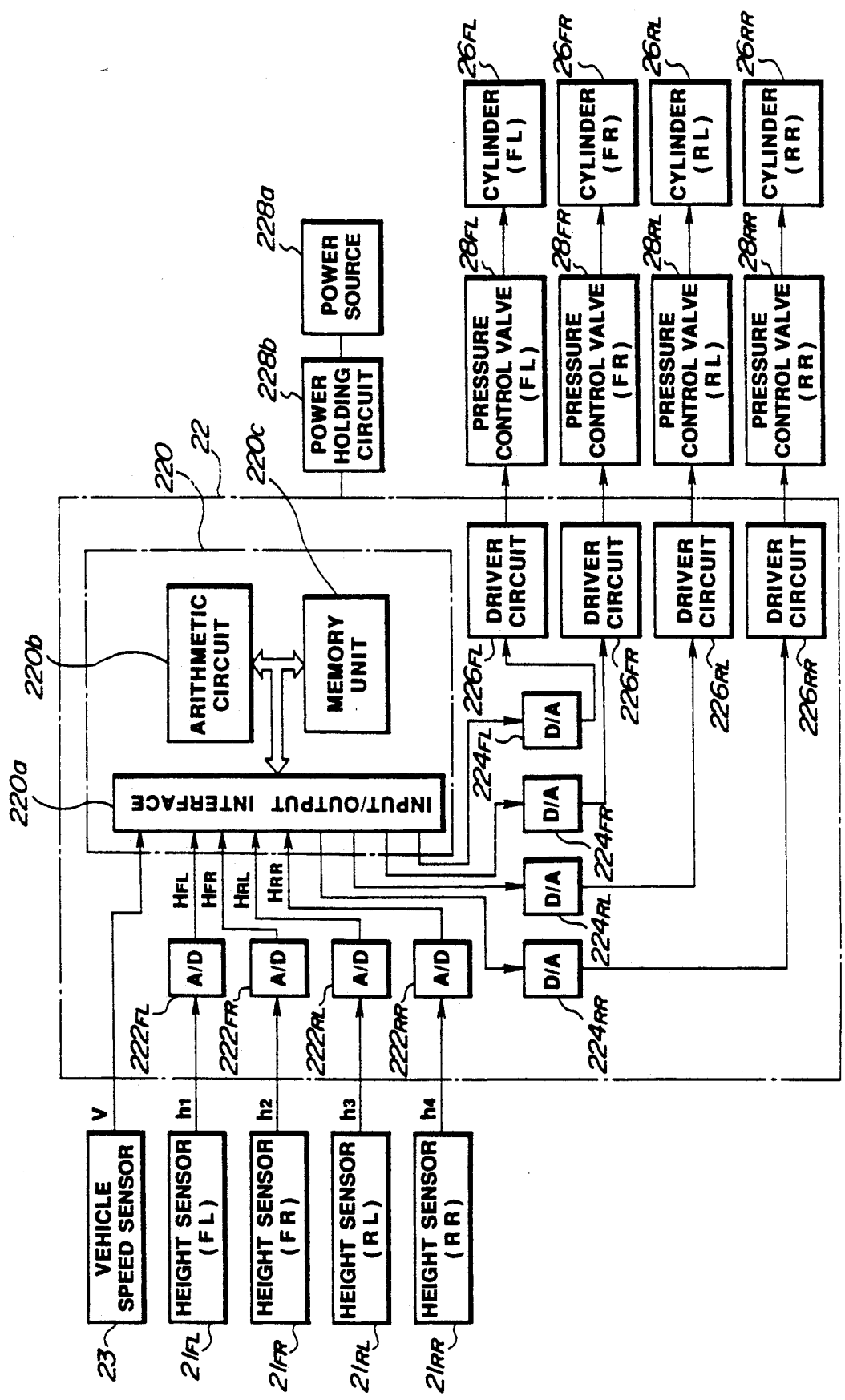
FIG. 6 is a block diagram showing the preferred embodiment of a control system associated with the preferred embodiment of the active suspension system according to the invention.
Figure 7A:
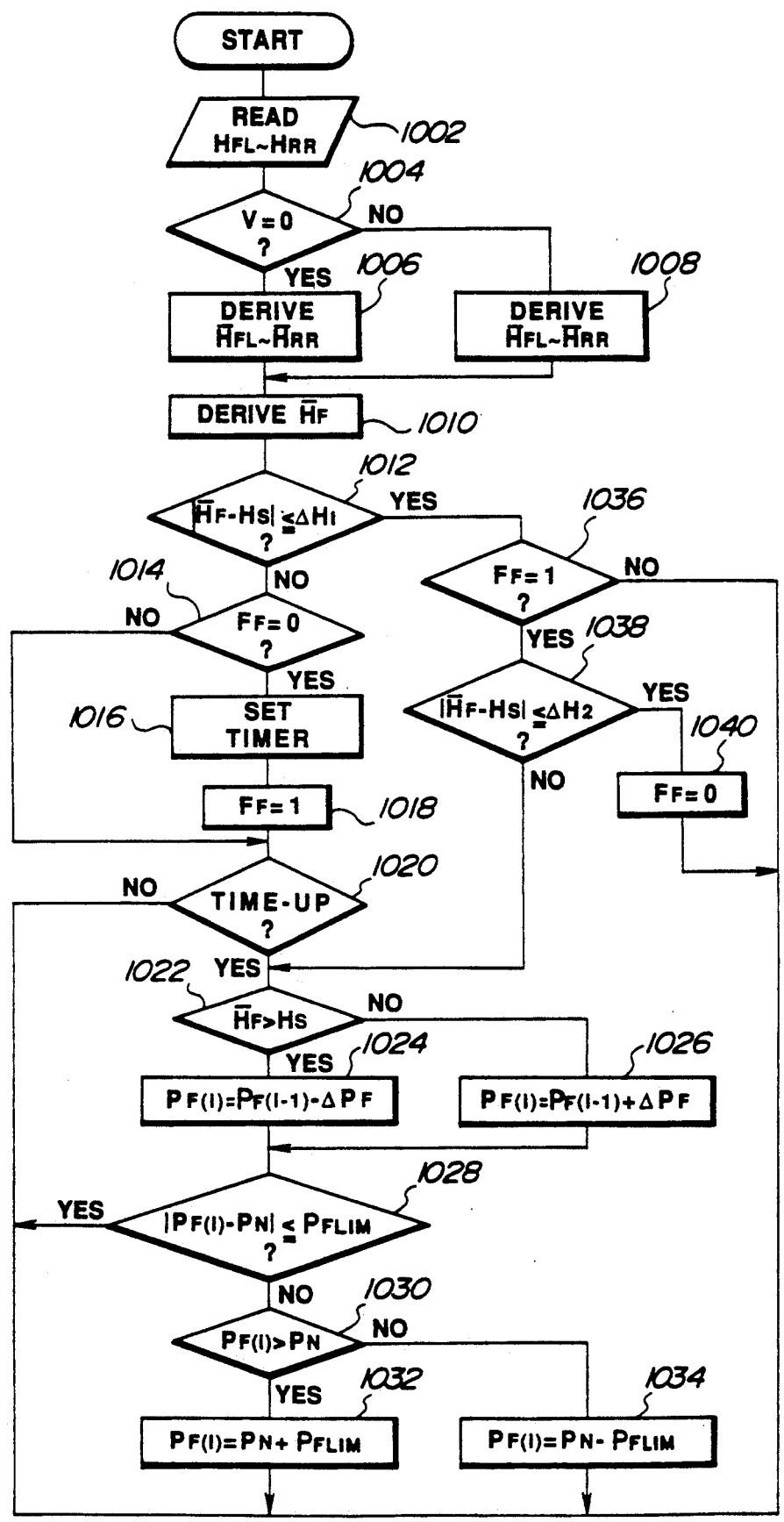
FIGS. 7(A), 7(B), 7(C) and 7(D) are flowcharts showing a sequence of routine of suspension control to be performed by the preferred embodiment of the suspension control system of FIG. 6.
Figure 7B:
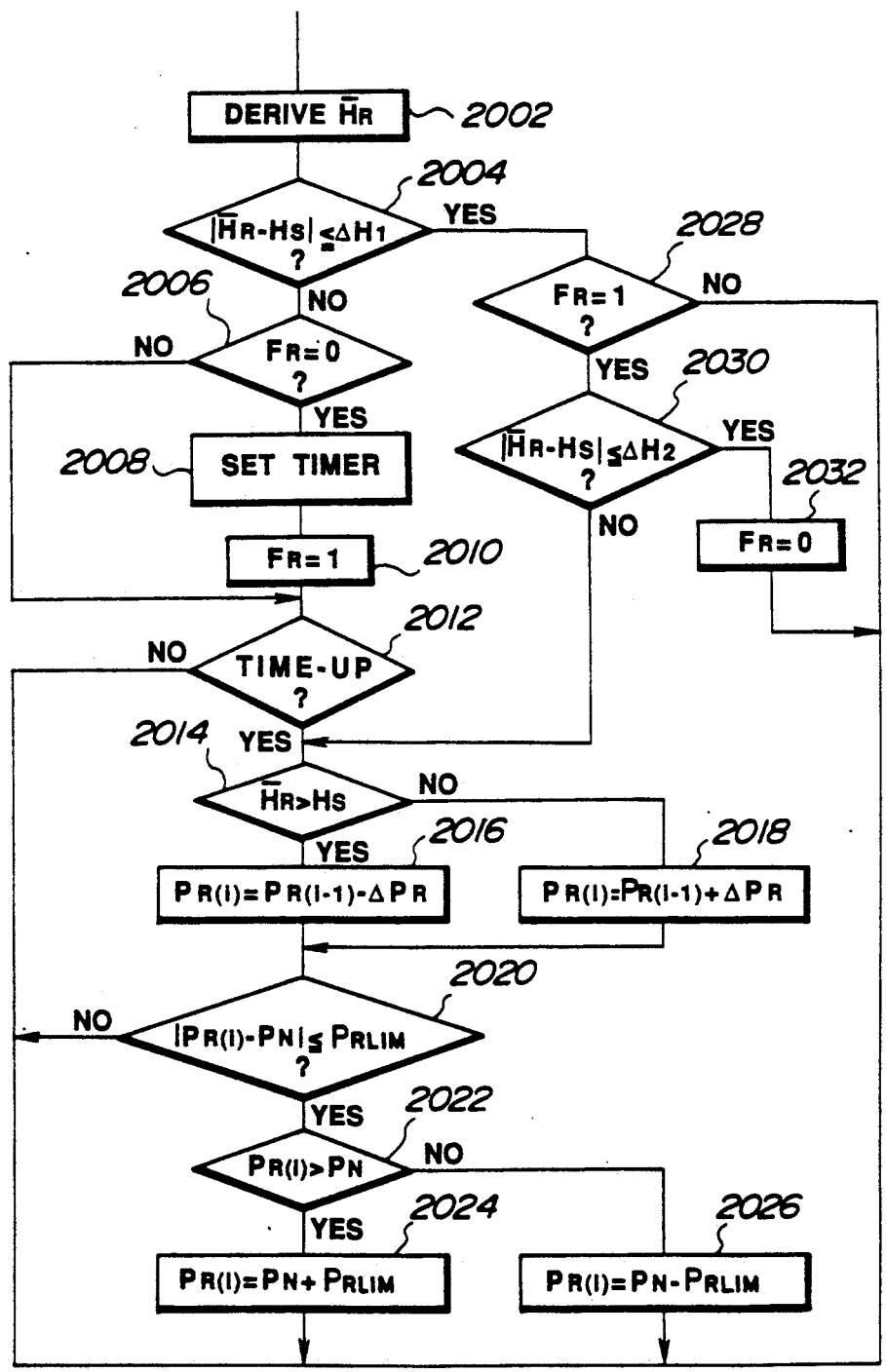
Figure 7C:
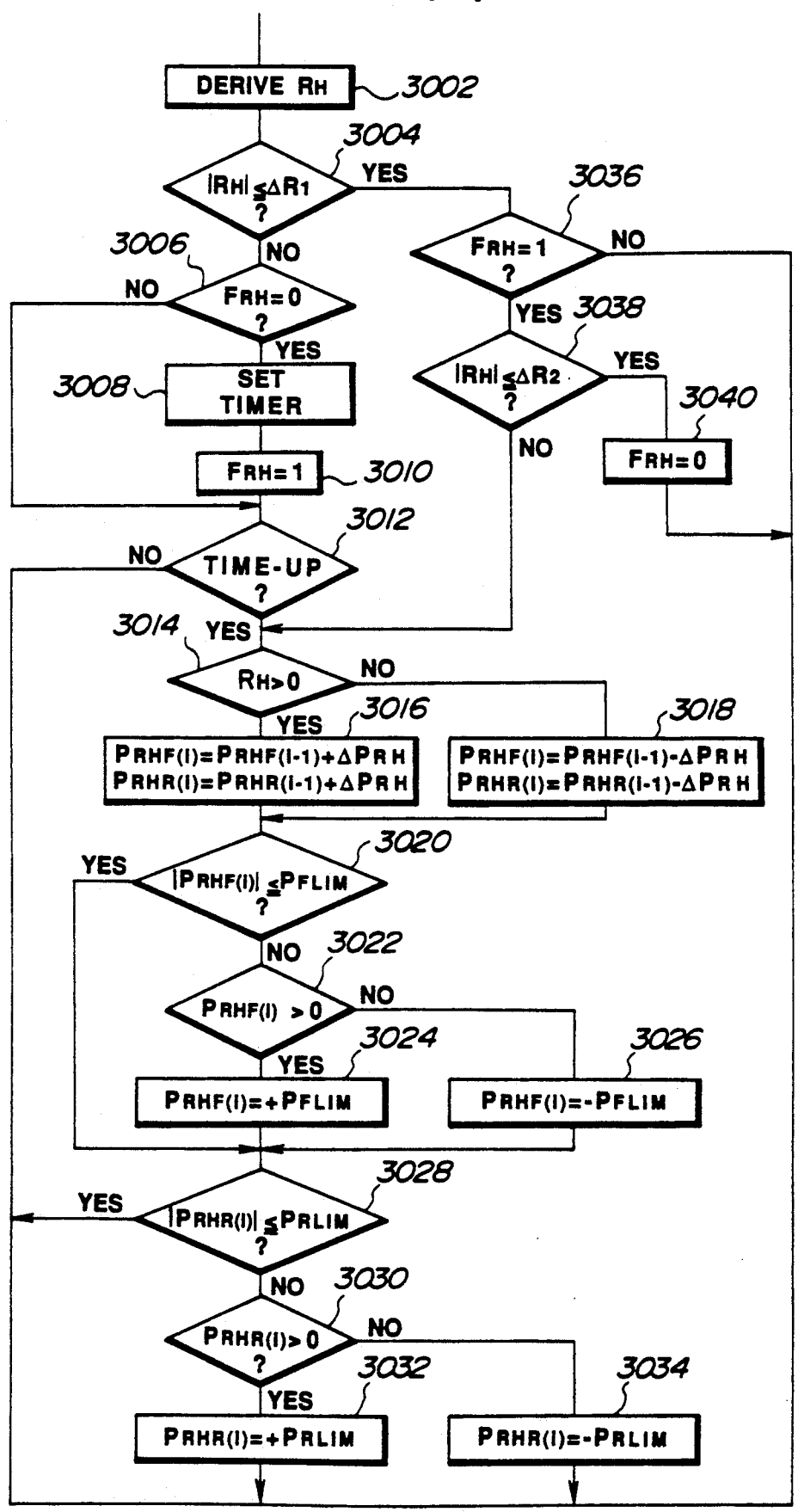
Figure 7D:
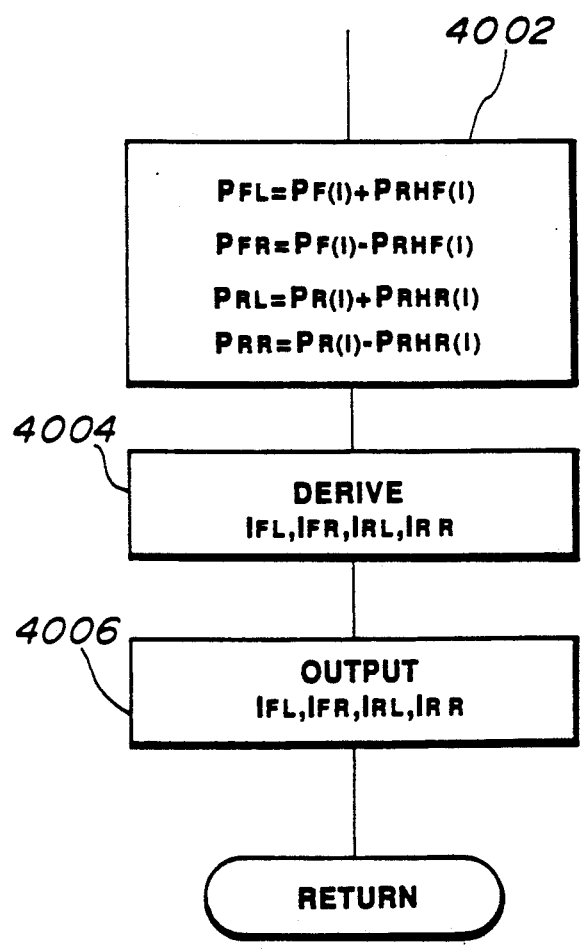

FIG. 6 shows the preferred embodiment of a control system associated with the preferred embodiment of the active suspension system as discussed above. The control unit 22 comprises a microprocessor 220 which includes an input/output interface 220a, an arithmetic circuit 220b and a memory unit 220c, analog-to-digital (A/D) converters 222FL, 222FR, 222RL and 222RR, digital-to-analog (D/A) converters 224FL, 224FR, 224RL and 224RR, and driver circuits 226FL, 226FR, 226RL and 226RR. The vehicular height sensors 21FL, 21FR, 21RL and 21RR are connected to the input/output interface 220a via A/D converters 222FL, 222FR, 222RL and 222RR. Respective of A/D converters 222FL, 222FR, 222RL and 222RR converts the vehicular height indicative signals $h_1$, $h_2$, $h_3$ and $h_4$ input in analog form into digital form vehicular height indicative data $H_{FL}$, $H_{FR}$, $H_{RL}$ and $H_{RR}$ representative of the vehicular height level at respective of front-left, front-right, rear-left and rear-right suspension systems. On the other hand, since the vehicle speed indicative signal V output from the vehicle speed sensor 23 is pulse signal having frequency proportional to the vehicular speed, the vehicle speed, indicative signal is directly input to the input/output interface 220a.

On the other hand, the microprocessor 22 processes the vehicular height data and the vehicle speed indicative data thus received for deriving suspension control commands which are current signals having a current value representative of control magnitude. The suspension control commands are fed to the driver circuits 226FL, 226FR, 226RL and 226RR via D/A converters 224FL, 224FR, 224RL and 224RR. The driver circuits 226FL, 226FR, 226RL and 226RR are respectively connected to the proportioning solenoids 29 of respective pressure control valves 28FL, 28FR, 28RL and 28RR. The proportioning solenoids 29 drive associated poppet valve 48 for adjusting pilot pressure in the pressure control valves 28FL, 28FR, 28RL and 28RR and thus adjust the fluid pressure in the working chamber 26d.

In practice, the arithmetic circuit 220b of the microprocessor 22 deriving running average data $\overline{H}_{FL}$, $\overline{H}_{FR}$, $\overline{H}_{RL}$ and $\overline{H}_{RR}$ at respective of front-left, front-right, rear-left and rear-right suspension systems, and front and rear average height data $\overline{H}_F$ and $A_R$. In practice, the front and rear average height data $\overline{H}_F$ and $\overline{H}_R$ are derived from the following equations:

$$\overline{H}_F = (\overline{H}_{FL} + \overline{H}_{FR})/2 \quad (1)$$

$$\overline{H}_R = (\overline{H}_{RL} + \overline{H}_{RR})/2 \quad (2)$$

Then, with respect to the front and rear average height data $\overline{H}_F$ and $\overline{H}_R$, check is performed whether they are maintained within a deadband $\pm \Delta H_1$ of a predetermined target height $H_s$. When the front and rear average height data $\overline{H}_F$ and $\overline{H}_R$ are within the deadline, i.e., $|\overline{H}_F - H_S| \pm \Delta H_1$ or $|\overline{H}_R - H_S| \pm \Delta H_1$, the suspension control command is maintained unchanged. On the other hand, when the front and rear average height data $\overline{H}_F$ and $\overline{H}_R$ is output of the deadband, i.e. $\overline{H}_F > H_S + \Delta H_1$, $\overline{H}_F < H_S - \Delta H_1$, $\overline{H}_R > H_S + \Delta H_1$, or $\overline{H}_R < H_S - \Delta H_1$, the suspension control commands are changed in such a manner that the front and rear average heights $\overline{H}_F$ and $\overline{H}_R$ are within a predetermined acceptable range $\pm \Delta H_2$ with a predetermined variation characteristics. Therefore, the suspension command value $P_i$ with be varied in a rate of $\Delta P$. Therefore, the instantaneous suspension control command can be expressed by $(P_i = P_{i-1} + \Delta P)$. With this height dependent control command values can be derived.

The arithmetic circuit 220b further derives vehicular rolling magnitude indicative data $R_H$ from the following equation:

$$R_H = \{(\overline{H}_{FR} + \overline{H}_{RR})/2 - (\overline{H}_{FL} + \overline{H}_{RL})/2\}/2 \quad (3)$$
$$= (\overline{H}_{FR} + \overline{H}_{RR} - \overline{H}_{FL} - \overline{H}_{RL}/4$$

The arithmetic circuit 220b then derives the rolling magnitude dependent control value $\Delta P_{RH}$ on the basis of the rolling magnitude indicative data $R_H$. The rolling magnitude dependent control value $\Delta P_{RH}$ is added to and subtracted from the height dependent control command value $P_i$ so that adjustment at left and right side is done in opposite direction. Namely, in case that the rolling magnitude dependent control value $\Delta P_{RH}$ is added to the height dependent control command value $P_i$ for the front-left suspension mechanism, the same value, i.e. $\Delta P_{RH}$ is subtracted from the height dependent control command value $P_i$ for the front-right suspension mechanism.

As seen from FIG. 6, the control system further includes a power supply circuit comprising a power source, e.g. vehicular battery 228a and a power holding section 228b which may comprise an OFF-delay timer, for maintaining power supply after turning OFF of power switch, i.e. ignition switch.

Operation of the aforementioned pressure control valve 28 in terms of control of suspension characteristics and absorption of road shock will be discussed herebelow.

In general, the pressurized working fluid source unit 16 supplies the predetermined line pressure. For example, the line pressure in the supply line 35 may be set at a pressure of 80 kgf/cm$^2$.

When the vehicle steadily travels on a smooth straight road, the current value of the control signal to be applied to the actuator 29 of the pressure control valve 28 is maintained at the neutral value $I_N$. As long as the neutral value $I_N$ of the control signal is applied to the actuator 29, the proportioning solenoid coil 68 is energized at a magnitude corresponding to the neutral value $I_N$ of the control signal to place the poppet valve 48 at the corresponding position. At this position, the flow resistance at the communication path opening 46A, path area of which is restricted by the valve head 48a of the poppet valve 48 becomes the neutral value. At this position of the poppet valve 48, the pilot pressure $P_P$ within the pilot chamber PR is maintained at the neutral pressure $P_N$. At this condition, if the control pressure Pc in the pressure control port 54c is held equal to the fluid pressure in the working chamber 26d of the hydraulic cylinder 26, the fluid pressure in the upper and lower feedback chambers FU and FL are held in balance to each other. The valve spool 52 is maintained at the neutral position to shut fluid communication between the supply port 54s, the drain port 54r and the pressure control port 54c. Therefore, the control pressure Pc is maintained at the neutral pressure $P_N$.

At this condition, when relatively high frequency and small magnitude road shock input through the vehicular wheel, is absorbed by fluid communication between the working chamber 26d and the pressure accumulator 34 via the orifice 32. The flow restriction in the orifice 32 serves to absorb the bounding and rebounding energy.

Therefore, high frequency and small magnitude road shock can be effectively absorbed so as not to be transmitted to the vehicle body.

When the piston 26c strokes in rebounding direction compressing the working chamber 26d, the fluid pressure in the working chamber increases to increase the control pressure Pc in the pressure control port 54c. Therefore, the control pressure Pc becomes higher than the pilot pressure Pp in the pilot chamber PR. This results in increasing of the fluid pressure in the lower feedback chamber FL at a magnitude higher than that in the upper feedback chamber FU. This causes upward movement of the valve spool 52 to establish fluid communication between the drain port 54r and the pressure control port 54c. Therefore, the pressure in the pressure control port 54c is drained through the drain line 37. This causes pressure drop at the pressure control port 54c so that the control pressure Pc becomes lower than the pilot pressure Pp in the pilot chamber PR. Then, the fluid pressure in the upper feedback chamber FU becomes higher than that in the lower feedback chamber FL. Therefore, the valve spool 52 is shifted downwardly to establish fluid communication between the supply port 54s and the pressure control port 54c. The pressurized working fluid in the supply line 35 is thus supplied to the working chamber 26d via the pressure control port 54c to increase the fluid pressure. By repeating the foregoing cycles, pressure balance is established between the pressure control port 54c and the pilot chamber PR. Therefore, the control pressure Pc as well as the fluid pressure in the working chamber 26d are adjusted to the pilot pressure.

During the pressure adjusting operation set forth above, the fixed throttling orifice Pro serves for restricting fluid flow from the pressure control port 54c to the drain line 37. This flow restriction at the orifice Pro serves as resistance against the rebounding stroke of the piston 26c to damp or absorb energy causing rebounding motion of the vehicle body. Furthermore, as set out, working fluid in the pilot chamber PR is generally introduced through the pilot path PP via the multi-stage orifice Qp and return through the pilot return path PT via the lower section 42U1 of the control chamber 42U and via the multi-stage orifice Pr. As long as the fluid flow in the pilot return path PT is not disturbed and thus steady. The most upstream side orifice P is mainly effective for restricting the fluid flow. Therefore, magnitude of flow restriction is relatively small so as to provide sufficient response characteristics in reduction of the pilot pressure. On the other hand, when the working fluid flowing from the control chamber 42U confluence with the working fluid from the pilot chamber PR, back pressure is produced in the drain port 54r, the fluid flowing through the pilot return path PT is disturbed and thus becomes unstable. This tends to cause serving of the pressurized fluid from the drain port 54r to the pilot chamber PR. In such case, all of the orifices in the multi-stage orifice Pr is effective to create greater flow restriction than that for the steady flow. This avoids influence of the back pressure created in the drain port 54r.

Similarly, in response to the bounding stroke of the piston 26c, the valve spool 52 is shifted up and down to absorb bounding energy and maintains the fluid pressure in the working chamber 26d of the hydraulic cylinder 26 at the neutral pressure.

On the other hand, when the anti-rolling suspension control is taken place in response to the lateral acceleration exerted on the vehicle body, the control signal current value is derived on the basis of the magnitude of the lateral acceleration monitored by the lateral acceleration sensor 23. Generally, in order to suppress rolling motion of the vehicular body, the fluid pressure in the working chamber 26d of the hydraulic cylinder 26 which is provided for the suspension mechanism at the side where the vehicular height is lowered across the neutral position, is increased to suppress lowering motion of the vehicle body. On the other hand, the fluid pressure in the working chamber 26d of the hydraulic cylinder 26 which is provided for the suspension mechanism at the side where the vehicular height is risen across the neutral position, is decreased to suppress rising motion of the vehicle body. Therefore, in order to control the pressures in the working chambers 26d of the both side hydraulic cylinders 26, control signal current values are increased and decreased across the neutral value $I_N$.

For example, when rolling motion is caused by left turn of the vehicle, control current for the actuators 29 of the pressure control valves 28 controlling the fluid pressures in the front-right and rear-right hydraulic cylinders 26FR and 26RR are to be increased to be greater than the neutral current $I_N$, and the control current for the actuator of the pressure control valves 28 controlling the fluid pressures in the front-left and rear-left hydraulic cylinders 26FL and 26RL are to be decreased to be smaller than the neutral current $I_N$. By the control current supplied to respective actuators 29, the proportioning solenoid coils 68 are energized at the magnitudes corresponding to the control signal currents to place the poppet valves 48 at respective corresponding positions. By variation of the positions of the poppet valves 48, flow restriction magnitude at respective communication path openings 46A is varied to vary the pilot pressures Pp in the pilot chamber PR. As set forth, since the fluid pressures in the working chambers 26d become equal to the pilot pressures Pp, the suspension characteristics at respective hydraulic cylinders 26 can be adjusted.

Anti-pitching, bouncing suppressive suspension control can be performed substantially in the same manner to that discussed with respect to the anti-rolling control.

Process of control will be discussed in further detail with reference to FIGS. 7(A), 7(B), 7(C) and 7(D).

The shown process is triggered every given intervals, e.g. 50 ms and executed as an interrupt routine. At a step 1002, the vehicular height indicative data $H_{FL}$, $H_{FR}$, $H_{RL}$ and $H_{RR}$ and the vehicle speed indicative data V are read out. Then, at a step 1004, check is performed whether the vehicle speed indicative data V represents vehicle speed zero. If the answer at the step 1004 is positive and thus judgement can be made that the vehicle is stopping, the vehicular height representing data read in last three execution cycles are read out and average height data $\overline{H}_{FL}$, $\overline{H}_{FR}$, $\overline{H}_{RL}$ and $\overline{H}_{RR}$ are calculated over four execution cycles with the vehicular height representative data of the last three preceding execution cycles and that of the current execution cycle. The front-left, front-right, rear-left and rear-right average height data $\overline{H}_{FL}$, $\overline{H}_{FR}$, $\overline{H}_{RL}$ and $\overline{H}_{RR}$ are then stored in predetermined addresses in the memory unit, at a step 1006. On the other hand, when the answer at the step 1004 is negative and thus judgement is made that the vehicle is running, when 1/64 running averages data $\overline{H}_{FL}$, $\overline{H}_{FR}$, $\overline{H}_{RL}$ and $\overline{H}_{RR}$ is calculated at a step 1008. The running average data $\overline{H}_{FL}$, $\overline{H}_{FR}$, $\overline{H}_{RL}$ and $\overline{H}_{RR}$ are stored in the same addresses to that for storing the average height data $\overline{H}_{FL}$, $\overline{H}_{FR}$, $\overline{H}_{RL}$ and $\overline{H}_{RR}$ derived at the step 1006. Therefore, the addresses in the memory unit 220c for storing the average height data are updated in every execution cycle with the data derived at one of the steps 1006 and 1008.

At a step 1010, a front height average data $\overline{H}_F$ is derived by utilizing the equation (1) set forth above. Then, at a step 1012, the front height average data $\overline{H}_F$ is compared with a predetermined target height data $H_s$ to derive a difference. Then, at the step 1012, a check is performed whether the absolute value of the difference $|\overline{H}_F - H_s|$ is smaller than or equal to a predetermined deadband criterion $\Delta H_1$ which defines the deadband set about the target height $H_s$. When the absolute value of the difference $|\overline{H}_F - H_s|$ is greater than the deadband criterion $\Delta H_1$ as checked at the step 1012, judgement can be made that the front average height $\overline{H}_F$ is out of the deadband. Then, at a step 1014, a front height adjustment active state indicative flag $F_F$ is checked. When the front height adjustment active state indicative flag $F_F$ is in reset (0) state, a timer is set at a step 1016, which timer becomes TIME-UP after a given period of time. Thereafter, the front height adjustment active state indicative flag $F_F$ is set (1) at a step 1018.

When the front height adjustment active state indicative flag $F_F$ is set as checked at the step 1014, or, in the alternative, after the process at the step 1018, TIME-UP is checked at a step 1020. If TIME-UP is detected at the step 1020, subtraction of the target height data $H_s$ from the front average height $\overline{H}_F$ is performed at a step 1022 for checking if the difference $(\overline{H}_F - H_s)$ is greater than zero (0). If YES, a predetermined front height adjusting value $\Delta P_F$ is subtracted from the height dependent control command data $P_{F(i-1)}$ derived in the immediately preceding execution cycle for deriving a new front height control command data $P_{F(i)}$, at a step 1024. Otherwise, the predetermined front height adjusting value $\Delta P_F$ is added to the height dependent control command data $P_{F(i-1)}$ for deriving new front height control command data $P_{F(i)}$, at a step 1026. The new front height control command data $P_{F(i)}$ thus derived is stored in a predetermined address in the memory unit 220c.

Here, the predetermined front height adjusting value $\Delta P_F$ is derived in view of a spring coefficient $K_F$ of the coil springs 36 in the front suspension mechanism, an effective area $A_F$ of the active cylinders $26_{FL}$ and $26_{FR}$, a predetermined height adjustment speed $V_H$ and an execution interval T of the shown routine. The predetermined front height adjusting value $\Delta P_F$ employed in the shown embodiment is expressed by:

$$\Delta P_F \times (\Delta V_H \times K_F \times T)/A_F \qquad (4)$$

Then, a difference between the new front height control command data $P_{F(i)}$ and a preset neutral height data $P_N$ is derived at a step 1028. An absolute value of the difference $|P_{F(i)} - P_N|$ is then compared with a predetermined front adjustment limit value $P_{FLIM}$ at the step 1028. When the absolute value of the difference $|P_{F(i)} - P_N|$ is greater than the front adjustment limit value $P_{FLIM}$ as checked at the step 1028, then check is performed whether the front height control command data $P_{F(i)}$ is greater than the neutral height data $P_N$ at a step 1030. If the front eighth control command data $P_{F(i)}$ is greater than the neutral height data $P_N$ as checked at the step 1030, then the front height control command data $P_{F(i)}$ is modified by a maximum height adjustment value as expressed by $(P_N + P_{FLIM})$ at a step 1032, and otherwise is modified by a minimum height adjustment value as expressed by $(P_N - P_{FLIM})$ at a step 1034. After one of the steps 1032 and 1034, the process goes to a step 2002 at which a series of processes for height control for rear suspension mechanisms is processed.

On the other hand, when the absolute value of the difference $|\overline{H}_F - H_s|$ is smaller than or equal to the deadband criterion $\Delta H_1$, the front height adjustment active state indicative flag $F_F$ is checked at a step 1036. If the front height adjustment active state indicative flag $F_F$ is set as checked at the step 1036, a check is performed whether the absolute value of difference $|\overline{H}_F - H_s|$ is smaller than or equal to a predetermined acceptable height criterion $\Delta H_2$ which is set at a smaller value than the deadband criterion $\Delta H_1$, at a step 1038. If the answer at the step 1038 is NO, then process goes to the step 1022 and otherwise goes to a step 1040 to reset the front height adjustment active state indicative flag $F_F$. After resetting the flag $F_F$ at the step 1040 or when the flag $F_F$ is not set as checked at the step 1036, process also goes to the step 2002. At a step 2002, a rear height average data $\overline{H}_R$ is derived by utilizing the equation (1) set forth above. Then, at a step 2004, the rear height average data $\overline{H}_R$ is compared with a predetermined target height data $H_s$ to derive a difference. Then, at the step 2004, check is performed whether the absolute value of the difference $|\overline{H}_R - H_s'|$ is smaller than or equal to a predetermined deadband criterion $\Delta H_1$ which defines the deadband set about the target height $H_s$. When the absolute value of the difference $|\overline{H}_R - H_s|$ is greater than the deadband criterion $\Delta H_1$ as checked at the step 2004, judgement can be made that the rear average height $\overline{H}_R$ is out of the deadband. Then, at a step 2006, a rear height adjustment active state indicative flag $F_R$ is checked. When the rear height adjustment active state indicative flag $F_R$ is in reset (0) state, a timer is set at a step 2008, which timer becomes TIME-UP after a given period of time. Thereafter, the rear height adjustment active state indicative flag $F_R$ is set (1) at a step 2010.

When the rear height adjustment active state indicative flag $F_R$ is set as checked at the step 2006, or, in the alternative, after the process at the step 2010, TIME-UP is checked at a step 2012. If TIME-UP is detected at the step 2012, subtraction of the target height data $H_s$ from the rear average height $\overline{H}_R$ is performed at a step 2014 for checking if the difference $(\overline{H}_R - H_s)$ is greater than zero (0). If YES, a predetermined rear height adjusting value $\Delta P_R$ is subtracted from the height dependent control command data $P_{R(i-1)}$ derived in the immediately preceding execution cycle for deriving a new rear height control command data $P_{R(i)}$, at a step 2016. Otherwise, the predetermined rear height adjusting value $\Delta P_R$ is added to the height dependent control command data $P_{R(i-1)}$ for deriving new rear height control command data $P_{R(i)}$, at a step 2018. The new rear height control command data $P_{R(i)}$ thus derived is stored in a predetermined address in the memory unit 220c.

Here, the predetermined rear height adjusting value $\Delta P_R$ is derived in view of a spring coefficient $K_R$ of the coil springs 36 in the rear suspension mechanism, an effective area $A_R$ of the active cylinders $26_{RL}$ and $26_{RR}$, a predetermined height adjustment speed $\Delta V_H$ and an execution interval T of the shown routine. The predetermined front height adjusting value $\Delta P_R$ employed in the shown embodiment is expressed by:

$$\Delta P_R = (\Delta V_H \times K_R \times T)/A_R \quad (4)$$

Then, a difference between the new rear height control command data $P_{R(i)}$ and a preset neutral height data $P_N$ is derived at a step 2020. An absolute value of the difference $|P_{R(i)-PN}|$ is then compared with a predetermined rear adjustment limit value $P_{RLIM}$ at the step 2020. When the absolute value of the difference $|P_{R(i)-PN}|$ is greater than the rear adjustment limit value $P_{RLIM}$ as checked at the step 2020, then a check is performed whether the rear height control command data $P_{R(i)}$ is greater than the neutral height data $P_N$ at a step 2022. If the rear eighth control command data $P_{R(i)}$ is greater than the neutral height data $P_N$ as checked at the step 2022, then the rear height control command data $P_{R(i)}$ is modified by a maximum height adjustment value as expressed by $(P_N + P_{RLIM})$ at a step 2024, and otherwise is modified by a minimum height adjustment value as expressed by $(P_N - P_{RLIM})$ at a step 2026. After one of the steps 2024 and 2026, process goes to a step 3002 at which a series of processes for anti-rolling control is processed.

On the other hand, when the absolute value of difference $|\overline{H}_R - H_s|$ is smaller than or equal to the deadband criterion $\Delta H_1$, the rear height adjustment active state indicative flag $F_R$ is checked at a step 2028. If the rear height adjustment active state indicative flag $F_R$ is set as checked at the step 2028, check is performed whether the absolute value of difference $|\overline{H}_R - H_s|$ is smaller than or equal to a predetermined acceptable height criterion $\Delta H_2$, at a step 2030. If the answer at the step 2030 is NO, then process goes to the step 2014 and otherwise goes to a step 2032 to reset the rear height adjustment active state indicative flag $F_R$. After resetting the flag $F_R$ at the step 2032 or when the flag $F_R$ is not set as checked at the step 2028, process also goes to the step 3002.

In the anti-rolling control process, the vehicular rolling magnitude indicative data $R_H$ is derived by the foregoing equation (3), at a step 3002. Then, the absolute value $|R_H|$ of the rolling magnitude indicative data is compared with a predetermined rolling deadband criterion $\Delta R_1$, at a step 3004 so as to check whether magnitude of rolling is within a predetermined deadband range which is set in a range of $+\Delta R_1$ from the substantially horizontal neutral position of the vehicular body, or not. When the absolute value $|R_H|$ is greater than the rolling deadband criterion $\Delta R_1$, judgement can be made that the rolling magnitude is out of the deadband range. Then, a rolling suppressive control active state indicative flag $F_{RH}$ is checked whether the flag is in reset (0) state, at a step 3006. If the answer at the step 3006 is YES, then, a timer for measuring a predetermined period of time, is set at a step 3008. Then, the rolling suppressive control active state indicative flag $F_{RH}$ is set at (1) at a step 3010.

If the rolling suppressive control active state indicative flag $F_{RH}$ is reset as checked at the step 3006, or after the process at the step 3010, TIME-UP is checked at a step 3012. If TIME-UP is not detected as checked at the step 3012, process directly goes to a step 4002 in a process for deriving the suspension control commands. When TIME-UP is detected at the step 3012, the rolling magnitude indicative data $R_H$ is checked whether it is greater than zero (0) at a step 3014. If the answer is positive (YES) at the step 3014, then, a predetermined anti-rolling adjusting value $\Delta P_{RH}$ is added for front and rear anti-rolling control values $P_{RHF(i-1)}$ and $P_{RHR(i-1)}$ derived in the immediately preceding execution cycle for deriving new anti-rolling control values $P_{RHF(i)}$ and $P_{RHR(i)}$ at a step 3016. On the other hand, when the answer at the step 3014 is negative, then the predetermined anti-rolling adjusting value $\Delta P_{RH}$ is substracted from front and rear anti-rolling control values $P_{RHF(i-1)}$ and $P_{RHR(i-1)}$ for deriving new anti-rolling control values $P_{RHF(i)}$ and $P_{RHR(i)}$ at a step 3018.

The absolute value of the front anti-rolling control value $|P_{RHF(i)}|$ is compared with the predetermined front adjustment limit value $P_{FLIM}$ at a step 3020. If the front anti-rolling control value $P_{RHF(i)}$ is smaller than or equal to the front adjustment limit value $P_{FLIM}$ as checked at the step 3020, a check is further performed whether the front anti-rolling control value $P_{RHF(i)}$ is greater than zero (0) at a step 3022. If the front anti-rolling control value $P_{RHF(i)}$ is greater than zero as checked at the step 3022, the front anti-rolling control value $P_{RHF(i)}$ is modified to be coincident with the front adjustment limit value $P_{FLIM}$ at a step 3024. On the other hand, when the front anti-rolling control value $P_{RHF(i)}$ is smaller than zero (0) as checked at the step 3022, then the front anti-rolling control value $P_{RHF(i)}$ is modified to be coincident with the front adjustment limit value $-P_{FLIM}$ at a step 3026. After the process at one of the steps 3024 and 3026 or when the absolute value of the front anti-rolling control value $|P_{RHF(i)}|$ is smaller than the front adjustment limit value $P_{FLIM}$ as checked at the step 3020, process goes to a step 3028.

At the step 3028, the absolute value of the rear anti-rolling control value $|P_{RHR(i)}|$ is compared with the predetermined rear adjustment limit value $P_{RLIM}$. If the rear anti-rolling control value $P_{RHR(i)}$ is smaller than or equal to the rear adjustment limit value $P_{RLIM}$ as checked at the step 3028, a check is further performed whether the rear anti-rolling control value $P_{RHR(i)}$ is greater than zero (0) at a step 3030. If the rear anti-rolling control value $P_{RHR(i)}$ is greater than zero as checked at the step 3030, the rear anti-rolling control value $P_{RHR(i)}$ is modified to be coincident with the rear adjustment limit value $P_{RLIM}$ at a step 3032. On the other hand, when the rear anti-rolling control value $P_{RHR(i)}$ is smaller than zero (0) as checked at the step 3030, then the rear anti-rolling control value $P_{RHR(i)}$ is modified to be coincident with the rear adjustment limit value $-P_{RLIM}$ at a step 3034. After the process at one of the steps 3032 and 3034 or when the absolute value of the rear anti-rolling control value $|P_{RHR(i)}|$ is smaller than the rear adjustment limit value $P_{RLIM}$ as checked at the step 3028, process goes to a step 4002.

On the other hand, when the absolute value of the rolling magnitude indicative data $|R_H|$ is smaller than or equal to the anti-rolling deadband criterion $\Delta R_1$ as checked at the step 3004, the anti-rolling control active state indicative flag $F_{RH}$ is checked whether it is set, at a step 3036. If the anti-rolling control active state indicative flag $F_{RH}$ is set as checked at the step 3036, the absolute value of the rolling magnitude indicative data $|R_H|$ is compared with a predetermined acceptable rolling criterion $\Delta R_2$ which is set to be a smaller value than the anti-rolling deadband criterion $\Delta R_1$, at a step 3038. If the absolute value of the rolling magnitude indicative data $|R_H|$ is greater than the acceptable rolling criterion $\Delta R_2$, process goes to the step 3014. On the other hand, if the absolute value of the rolling magnitude indicative data $|R_H|$ is smaller than or equal to the acceptable rolling criterion $\Delta R_2$, then, the anti-rolling control active state indicative flag $F_{RH}$ is reset at a step 3040. Thereafter, process goes to the step 4002.

At the step 4002, the suspension control pressure values $P_{FL}$, $P_{FR}$, $P_{RL}$ and $P_{RR}$ for respective of front-left, front-right, rear-left and rear-right suspension mechanisms are derived from the following equations:

$$P_{FL} = P_{F(i)} + P_{RHF(i)} \quad (6)$$

$$P_{FR} = P_{F(i)} - P_{RHF(i)} \quad (7)$$

$$P_{RL} = P_{R(i)} + P_{RHR(i)} \quad (8)$$

$$P_{RR} = P_{R(i)} - P_{RHR(i)} \quad (9)$$

Then, on the basis of the suspension control pressure values $P_{FL}$, $P_{FR}$, $P_{RL}$ and $P_{RR}$ thus derived at the step 4002, current values $I_{FL}$, $I_{FR}$, $I_{RL}$ and $I_{RR}$ of respective front-left, front-right, rear-left and rear-right suspension control commands are derived at a step 4004. Then the suspension control commands $I_{FL}$, $I_{FR}$, $I_{RL}$ and $I_{RR}$ are output to respective of the proportioning solenoid at a step 4006. Then, process goes END and return to a main routine.

It should be appreciated that the front and rear height control command data and the anti-rolling control values are initially set in response to ON-set of the power supply switch, e.g. ignition switch. In the shown embodiment, the front and rear height control command data $P_{F(i)}$ and $P_{R(i)}$ are set at values respectively corresponding to the neutral pressure $P_N$ and the anti-rolling adjustment values $P_{RHF(i)}$ and $P_{RHR(i)}$ are set to zero, during initial set.

Here, assuming that the vehicular height level is lowered due to loading of passengers in a vehicular state where no vehicular rolling is caused, and that the vehicular height level is thus lowered down to the deadband set with respect to the target height $H_s$, the difference of front and rear average height values $\overline{H}_F$ and $\overline{H}_R$ and the target height $H_s$ is maintained to be greater than the height adjustment deadband criterion $\Delta H_1$. Therefore, process through the steps 1014 to 1034 is performed. At the initial stage, since the elapsed time measured by the timer does not reach the predetermined TIME-UP value, process directly goes to the step 2002 from the step 1020. Through the process of steps 2002 through 2026, TIME-UP cannot be detected at the step 2012, therefore, the process directly goes to the step 3002. At this time, since the vehicular attitude is maintained at the normal state, the anti-rolling control values $P_{RHF(i)}$ and $P_{RHR(i)}$ derived through the steps 3002 to 3034 are maintained unchanged. On the other hand, after expiration of the predetermined period of time, process through the steps 1022 to 1034 is performed so that the front height control command data $P_{F(i)}$ is derived at the step 1032. Then, process through the steps 2014 through 2026 is performed for deriving the rear height control command data $P_{R(i)}$ at the step 2024. Therefore, suspension control command for rising the vehicular height for respective suspension mechanism is output for causing rising of the vehicular height level simultaneously for all suspension systems.

By rising of the vehicular height, the absolute value of difference between the front and rear average heights $\overline{H}_F$ and $\overline{H}_R$ and the target height is gradually reduced to become smaller than the height adjustment deadband criterion. This is detected respectively at the steps 1012 and 2004. However, at this time, since the front and rear height adjustment active state indicative flags $F_F$ and $F_R$ are maintained in set states. Therefore, process goes to the steps 1038 and 2030 for comparing the differences $|\overline{H}_F - H_S|$ and $|\overline{H}_R - H_S|$ with the acceptable height criterion $\Delta H_2$. Since the acceptable height criterion $\Delta H_2$ is set at smaller value than the height adjustment deadband criterion $\Delta H_1$, the answers at steps 1038 and 2030 becomes negative. Therefore, the height adjustment active state indicative flags $F_F$ and $F_R$ are maintained in set position to continue height adjustment.

By continuing height adjustment, the vehicular height at respective suspension mechanisms enters into the acceptable range as defined by the acceptable height criterion $\Delta H_2$. Then, the answers at the steps 1038 and 2030 becomes positive to reset the height adjustment active state indicative flags $F_F$ and $F_R$ at the steps 1040 and 2032.

As can be appreciated herefrom, by providing a predetermined delay time in initiation of height adjustment after detecting the height level out of the predetermined deadband, unnecessary height adjustment operation in response to temporary change of the vehicular height can be avoided. On the other hand, by terminating height adjustment at the vehicular height in an acceptable height range which is narrower than the height adjustment deadband, hunting of control can be successfully prevented.

On the other hand, at the occurrence of vehicular rolling in a magnitude greater than the rolling deadband as defined by the anti-rolling criterion $\Delta R_1$, the timer is set at the step 3008 and the anti-rolling control active state indicative flag $F_{RH}$ is set at the step 3010. However, at this time, since the elapsed time is shorter than the TIME-UP criterion, the answer at the step 3012 becomes negative. Therefore, the anti-rolling control values $P_{RHF(i)}$ and $P_{RHR(i)}$ can be maintained zero. After expiration of the predetermined period, the process through the steps 3014 to 3034 is performed for deriving the anti-rolling control values $P_{RHF(i)}$ and $P_{RHR(i)}$. Therefore, the suspension control commands for respective of front-left, front-right, rear-left and rear-right suspension mechanisms, incorporating the anti-rolling control factor, are derived at the step 4002 with the equations (6) to (9). After this, the solenoid currents $I_{FL}$, $I_{FR}$, $I_{RL}$ and $I_{RR}$ are derived and respectively output to the electromagnetic solenoids for the pressure control valves, through steps 4004 and 4006. Similarly to the height adjustment, anti-rolling control is maintained until the rolling magnitude becomes smaller than the acceptable rolling criterion $\Delta R_2$ which is smaller than the anti-rolling control criterion $\Delta R_1$ for avoiding hunting of control.

FIG. 8 shows another embodiment of the control system for the preferred embodiment of the active suspension system according to the invention. In the shown embodiment, a lateral acceleration sensor 25 is added to the circuit in the former embodiment. The lateral acceleration sensor 25 monitors lateral acceleration exerted on the vehicular body to produce a lateral acceleration indicative signal G. The lateral acceleration indicative signal G is input to the control unit 22 via a gain adjusting circuit 252. The gain set in the gain adjusting circuit 252 may serve for adjusting response characteristics of rolling suppressive control. The output of the gain adjusting circuit 252 are fed to adders 254FL, 254FR, 254RL and 254RR. For the adders 254FL, 254FR, 254RL and 254RR, the suspension control commands converted by the D/A converters 226FL, 226FR, 226RL and 226RR are also inputted respectively. The output of the adders 254FL, 254FR, 254RL and 254RR are fed to the driver circuits 228FL, 228FR, 228RL and 228RR.

In the shown embodiment, since the anti-rolling factor is incorporated in the suspension control commands by deriving sums of the height control factor and anti-rolling control factor at respective of adders 254FL, 254FR, 254RL and 254RR, the process through the steps 3002 through 3040 becomes unnecessary.

As can be appreciated herefrom, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For instance, though the shown embodiments are directed to hydraulic active suspension system, it may be possible to apply the same technology for pneumatic type active suspension systems. Furthermore, the present invention may be applicable for hydraulic, pneumatic or hydropneumatic height regulator systems with roll stabilizing capability. Furthermore, the invention may be applicable for any of the prior proposed active suspension systems proposed in the following co-pending applications:

U.S. patent application Ser. No. 052,934, filed on May 22, 1989;

U.S. patent application Ser. No. 059,888, filed on June 9, 1987, corresponding European Patent Application has been published as First Publication No. 02 49 209;

U.S. patent application Ser. No. 060,856, filed on June 12, 1987, corresponding European Patent Application has been published as First Publication No. 02 49 227;

U.S. patent application Ser. No. 060,909, filed on June 12, 1987;

U.S. patent application Ser. No. 060,911, filed on June 12, 1987;

U.S. patent application Ser. No. 176,246, filed on Mar. 31, 1988, the corresponding European Patent Application has been published as First Publication No. 02 85 153;

U.S. patent application Ser. No. 178,066, filed on Apr. 5, 1988, the corresponding European Patent Application has been published as First Publication No. 02 86 072;

U.S. patent application Ser. No. 167,835, filed on Mar. 4, 1988;

U.S. patent application Ser. No. 244,008, filed on Sept. 14, 1988;

U.S. patent application Ser. No. 255,560, filed on Oct. 11, 1988;

U.S. patent application Ser. No. 266,763, filed on Nov. 3, 1988;

U.S. patent application Ser. No. 261,870, filed on Oct. 25, 1988;

U.S. patent application Ser. No. 263,764, filed on Oct. 28, 1988;

U.S. patent application Ser. No. 277,376, filed on Nov. 29, 1988;

U.S. patent application Ser. No. 303,338, filed on Jan. 26, 1989;

U.S. patent application Ser. No. 310,130, filed on Mar. 22, 1989;

U.S. patent application Ser. No. 327,460, filed on Mar. 22, 1989;

U.S. patent application Ser. No. 303,339, filed on Jan. 26, 1989;

U.S. patent application Ser. No. 331,602, filed on Mar. 31, 1989;

U.S. patent application Ser. No. 331,653, filed Mar. 31, 1989;

U.S. patent application Ser. No. 364,477, filed on June 12, 1989;

U.S. patent application Ser. No. 365,468, filed on June 12, 1989;

The disclosure of the above-identified co-pending applications are herein incorporated by reference for the sake of disclosure.

What is claimed is:

1. An active suspension system for a vehicular body, comprising:
   a plurality of fluid pressure operated actuators each having a working chamber and disposed between the vehicular body and front and rear, left and right, road wheels at respective suspension systems provided thereat;
   vehicular height monitoring means for monitoring a vehicular height at respective ones of the suspension systems, for providing vehicular height indicative data;
   means for performing height regulation, in which a single front height adjustment command for both of the front-left and front-right suspension systems is derived on the basis of a difference between a predetermined target vehicle height and an average height data at the two front suspension systems, and a single rear height adjustment command for both of rear-left and rear-right suspension systems is derived on the basis of a difference between the target vehicle height and an average height data at the two rear suspension systems, so as to adjust the vehicle height through a group control with said single front and rear height adjustment commands output to the respective actuators associated with said front and rear suspension systems;
   means for performing anti-roll control by deriving a vehicular rolling magnitude on the basis of said vehicular height indicative data of the front and back right and the front and back left suspension systems and deriving anti-rolling control commands in such a manner as to be applied in opposite phases to each other to said front and back right and front and back left suspension systems so as to reduce said rolling magnitude through an independent control with said anti-rolling control commands having opposite signs to each other with regard to said actuators associated with said front and back right and front and back left suspension systems; and
   means for outputting final control commands to each of said actuators so as to achieve said height regulation and said anti-roll control in response to vehicle driving conditions, said outputting means deriving said final control commands by adding or subtracting said anti-rolling control command to or from the respective of said front and rear height adjustment commands.

2. An active suspension system as set forth in claim 1, wherein said height regulation means is set at predetermined target height and a predetermined height control deadband is set with respect to said target height so that height adjustment is initiated while the vehicular height level is maintained out of said deadband.

3. An active suspension system as set forth in claim 1, wherein said anti-rolling control means includes means for arithmetically deriving said rolling magnitude on the basis of an average height data at front-left and rear-left suspension systems and an average height data at the front-right and rear-right suspension systems.

4. An active suspension system as set forth in claim 3, wherein said rolling magnitude deriving means calculates said rolling magnitude by dividing a difference between the average height data at said left suspension systems and the average height data at said right suspension systems by 2.

5. An active suspension system as set forth in claim 1, wherein said anti-rolling control means includes a lateral acceleration sensor for monitoring a lateral acceleration exerted on the vehicular body to produce a lateral acceleration indicative signal and means for converting said lateral acceleration indicative signal into an anti-rolling control command.

6. An active suspension system as set forth in claim 2, wherein said height regulation means is further set at an acceptable height range which is set with respect to said target height in narrower range than said height control deadband so that height adjustment is terminated when the vehicular height level at each of said suspension systems enters within said acceptable height range.

7. An active suspension system as set forth in claim 1, wherein said anti-rolling control means is set at a rolling control deadband so that anti-rolling control is initiated when the rolling magnitude increased to be out of the rolling control deadband.

8. An active suspension system as set forth in claim 7 wherein said anti-rolling control means is further set at an acceptable rolling magnitude range which is smaller than said rolling control deadband so that anti-rolling operation is terminated when the rolling magnitude becomes smaller than said acceptable rolling magnitude.

* * * * *